(12) United States Patent
Bae

(10) Patent No.: US 7,696,998 B2
(45) Date of Patent: Apr. 13, 2010

(54) PEN-BASED 3D DRAWING SYSTEM WITH 3D ORTHOGRAPHIC PLANE OR ORTHOGRAPHIC RULED SURFACE DRAWING

(75) Inventor: Seok-Hyung Bae, Ann Arbor, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 370 days.

(21) Appl. No.: 11/676,694

(22) Filed: Feb. 20, 2007

(65) Prior Publication Data
US 2008/0036773 A1      Feb. 14, 2008

Related U.S. Application Data

(60) Provisional application No. 60/775,225, filed on Feb. 21, 2006, provisional application No. 60/853,839, filed on Oct. 24, 2006.

(51) Int. Cl.
*G06T 11/20* (2006.01)
(52) U.S. Cl. .................... 345/441; 345/419; 345/420
(58) Field of Classification Search .............. None
See application file for complete search history.

(56) References Cited

U.S. PATENT DOCUMENTS

| | | | | |
|---|---|---|---|---|
| 5,237,647 A | * | 8/1993 | Roberts et al. .............. | 345/419 |
| 5,425,109 A | * | 6/1995 | Saga et al. .................. | 382/187 |
| 5,649,080 A | * | 7/1997 | Minakata .................... | 345/427 |
| 5,680,523 A | * | 10/1997 | Watkins et al. ............. | 345/419 |
| 5,844,566 A | * | 12/1998 | Lecland et al. ............. | 345/426 |
| 6,134,338 A | * | 10/2000 | Solberg et al. ............. | 382/113 |
| 6,549,201 B1 | * | 4/2003 | Igarashi et al. ............ | 345/423 |
| 6,628,279 B1 | * | 9/2003 | Schell et al. ............... | 345/420 |
| 6,842,175 B1 | * | 1/2005 | Schmalstieg et al. ....... | 345/427 |
| 6,981,229 B1 | * | 12/2005 | Balakrishnan et al. ..... | 715/863 |
| 7,139,796 B2 | * | 11/2006 | Rekimoto et al. .......... | 709/204 |
| 2002/0082081 A1 | * | 6/2002 | Takeuchi .................... | 463/32 |
| 2002/0155888 A1 | * | 10/2002 | Kitsutaka ................... | 463/30 |
| 2006/0082571 A1 | * | 4/2006 | McDaniel ................... | 345/419 |
| 2006/0227130 A1 | * | 10/2006 | Elchuri ....................... | 345/419 |
| 2006/0250393 A1 | * | 11/2006 | Tsang et al. ................ | 345/420 |

(Continued)

FOREIGN PATENT DOCUMENTS

EP      1 335 272 A2  A      8/2003

OTHER PUBLICATIONS

Accot, J. and Zhai, S., 2002, More than dotting the i's—Foundations for Crossing-Based Interfaces. In *Proceedings of CHI 2002*, ACM Press, 73-80.

(Continued)

*Primary Examiner*—Kee M Tung
*Assistant Examiner*—David H Chu
(74) *Attorney, Agent, or Firm*—Ralph E. Smith

(57) ABSTRACT

A pen-based system allow users, such as artists, graphic designers sand illustrators, and the like, to create accurate curve models by sketching. A tool set implemented in software that runs on a computer system combines paper sketch metaphors and a minimalist gesture set. This tool set provides an environment where the artists can focus on the creative task at hand rather than the details of operating software. A pen-based drawing method and system allows users to create and edit three dimensional ("3D") objects by sketching.

25 Claims, 27 Drawing Sheets

U.S. PATENT DOCUMENTS

| | | | |
|---|---|---|---|
| 2007/0080960 A1* | 4/2007 | Dayanand et al. | 345/419 |
| 2007/0279415 A1* | 12/2007 | Sullivan et al. | 345/427 |
| 2008/0246762 A1* | 10/2008 | Ogata et al. | 345/420 |
| 2009/0006039 A1* | 1/2009 | Watanabe | 703/1 |

OTHER PUBLICATIONS

Apitz, G. and Guimbretiere, F., 2004, A Crossing-Based Drawing Application. In *Proceedings of USIT 2004*, ACM Press, 3-12.

Bae, S.-H., Kim, W.-S., and Kwon, E., 2003, Digital Styling for Designers: Sketch Emulation in Computer Environment, *Lecture Notes in Computer Science (Proceedings of International Conference on Computational Science and its Applications 2003)*, 2669, 690-700.

Bae, S.-H., Kijima, R., and Kim, W.-S. 2003, Digital Styling for Designers: 3D Plane-Symmetric Freeeform Curve Creation Using Sketch Interface, *Lecture Notes in Computer Science (Proceedings of International Conference on Computational Science and its Applications, 2003)*, 2669, 701-710.

Baudel, T., 1994, A Mark-Based Interaction Paradigm for Free-Hand Drawing. In *Proceedings of USIT 1994*, ACM Press, 185-192.

Barrilleaux, J., 2001, 3d *User Interfaces with Java 3D.*, Manning.

Buxton, W., 1986, Chunking and Phrasing and The Design of Human-Computer Dialogues. In *Proceedings of IFIP World Computer Congress on Informational Processing*, North-Holland, 475-480.

Buxton, W., 1990, A Three-State Model of Graphical Input. In *Proceedings of IFIP Tc13 International Conference on Human-Computer Interaction*, North-Holland, 449-456.

Buxton, W., Fitzmaurice, G., Balakrishnan, R., and Kurtenbach, G., 2000, Large Displays in Automotive Design, *IEEE Computer Graphics and Applications 20*, 4, 68-75.

Chelsea, D., 1997, *Perspective! For Comic Book Artist*. Watson-Guptill.

Cohen, J.M., Markosian, L., Zeleznik, R.C., Hughes, J.F., and Barzel, R., 1999, An Interface for Sketching 3D Curves. In *Proceedings of I3D 1999*, ACM Press, 17-22.

Elber, G., 1995, Line Illustrations ∈ Computer Graphics, *The Visual Computer 11*, 6, 290-296.

Faugeras, O. and Luong, Q.T. 2001, *The Geometry of Multiple Images*, The MIT Press.

Fitts, P.M., 1954. The Information Capacity of the Human Motor System in Controlling the Amplitude of Movement, *Journal of Experimental Psychology*, 47, 381-391.

Fitzmaurice, G. W., Balakrishnan, R., Kurtenback, G., and Buxton, B., 1999, An Exploration into Supporting Artwork Orientation in the User Interface, In *Proceedings of CHI 1999*, ACM Press, 167-174.

Fitzmaurice, G., Khan, A., Pieke, R., Buxton, B., and Kurtenbach, G., 2003, Tracking Menus, In *Proceedings of UIST 2003*, ACM Press, 71-79.

Fowler, B. and Bartels, R, 1993, Constraint-Based Curve Manipulation, *IEEE Computer Graphics and Applications 13*, 5, 43-49.

Grossman, T., Balakrishnan, R., Kurtenbach, G., Fitzmaurice, G., Khan, A., and Buxton, B., 2001, Interaction Techniques for 3D Modeling on Large Displays. In *Proceedings of I3D 2001*, ACM Press, 17-23.

Grossman, T., Balakrishnan, R., Kurtenbach, G., Fitzmaurice, G., Khan, A., and Buxton, B., 2002, Creating Principal 3D Curves with Digital Tape Drawing, In *Proceedings of CHI 2002*, ACM Press, 121-128.

Guimbretiere, F. and Winograd, T., 2000, FlowMenu: Combining Command, Text and Data Entry. In *Proceedings of UIST 2000*, ACM Press, 213-216.

Igarashi, T., Matsuoka, S., Kawachiya, S., and Tanaka, H., 1997, Interactive Beautification: A Technique for Rapid Geometric Design. In *Proceedings of UIST 1997*, ACM Press, 105-114.

Igarashi, T., Matsuoka, S., Kawachiya, S., and Tanaka, H., 1997, Interactive Beautification: A Technique for Rapid Geometric Design, In *Proceedings of UIST 1997*, ACM Press, 105-114.

Igarashi, T., Matsuoka, S., Kawachiya, S., and Tanaka, H., 1999, Teddy: A Sketching Interface for 3D Freeform Design, In *Proceedings of ACM SIGGRAPH 99*, ACM Press, 409-416.

Karpenko, O., Hughes, J.F., and Raskar, R, 2004, Epipolar Methods for Multi-View Sketching, In *Proceedings of the 2004 EUROGRAPHICS Workshop on Sketch-Based Interfaces and Modeling*, 167-173.

Kurtenbach, G. and Buxton, W., 1993, The Limits of Expert Performance Using Hierarchic Marking Menus, in *Proceedings of CHI 1993*, ACM Press, 482-487.

Kurtenbach, G., Fitzmaurice, G., and Buxton, B., 1997, The Design of a GUI Paradigm Based on Tablets, Two-Hands, and Transparency, In *Proceedings of CHI 1997*, ACM Press, 35-42.

Michener, J.C., and Carlbom, I.B., 1980, Natural and Efficient Viewing Parameters, in *Computer Graphics (Proceedings of ACM SIGGRAPH 80)*, 14, 3, 238-245.

Moran, T.P., Chiu, P., and Van Melle, W., 1997, Pen-Based Interaction Techniques for Organizing Material on an Electronic Whiteboard. In *Proceedings of UIST 1997*, ACM Press, 45-54.

Ramos, G., Boulos, M., and Balakrishnan, R., 2004, Pressure Widgets, In *Proceedings of CHI 2004*, ACM Press, 487-494.

Robertson, S. With The Hot Wheels Designers, 2004, *How to Draw Cars the Hot Wheels Way*, MBI.

Saund, E. and Lank, E., 2003, Stylus Input and Editing Without Prior Selection of Mode, In *Proceedings of UIST 2003*, ACM Press, 213-216.

Singh, K., Grimm, C., and Sundarsanam, N., 2004, The IBar: A Perspective-Based Camera Widget, In *Proceedings of UIST 2004*, ACM Press, 95-98.

Singh, K., 2006, Industrial Motivation for Interactive Shape Modeling: A Case Study in Conceptual Automotive Design, In *Course Material (Interactive shape editing)* presented at ACM SIGGRAPH, 2006.

Taylor, T., and Hallett, L., 1996, *How to Draw Cars Like A Pro*, Motorbooks International.

Tsang, S., Balakrishnan, R., Singh, K., and Ranjan, A., 2004, A Suggestive Interface for Image Guided 3D Sketching, In *Proceedings of CHI 2004*, ACM Press, 591-598.

Zeleznik, R. C., Herndon, K. P., and Hughes, J. F., 1996, Sketch: An Interface for Sketching 3D Scenes, In *Proceedings SIGGRAPH 96*, ACM Press, 163-170.

Zeleznik, R. and Miller, T., 2006, Fluid Inking: Augmenting the Medium of Free-Form Inking with Gestures, in *Proceedings of the 2006 Conference on Graphics Interface*, ACM Press, 155-162.

"Stylus Input and Editing Without Prior Selection of Mode," E. Saund and E. Lank, Proceedings of the UIST '03, ACM Symposium On User Interface Software and Technology, [online] Nov. 2003, pp. 213-216, XP002471486 Canada.

"Sketching with a Low-latency Electronic Ink Drawing Tablet," Alex Hazen et al., Proceedings Of The 3rd International Conference On Computer Graphics And Interactive Techniques In Australasia and South East Asia, [online] 2005, pp. 51-60, XP00241912, Dunedin, New Zealand.

* cited by examiner

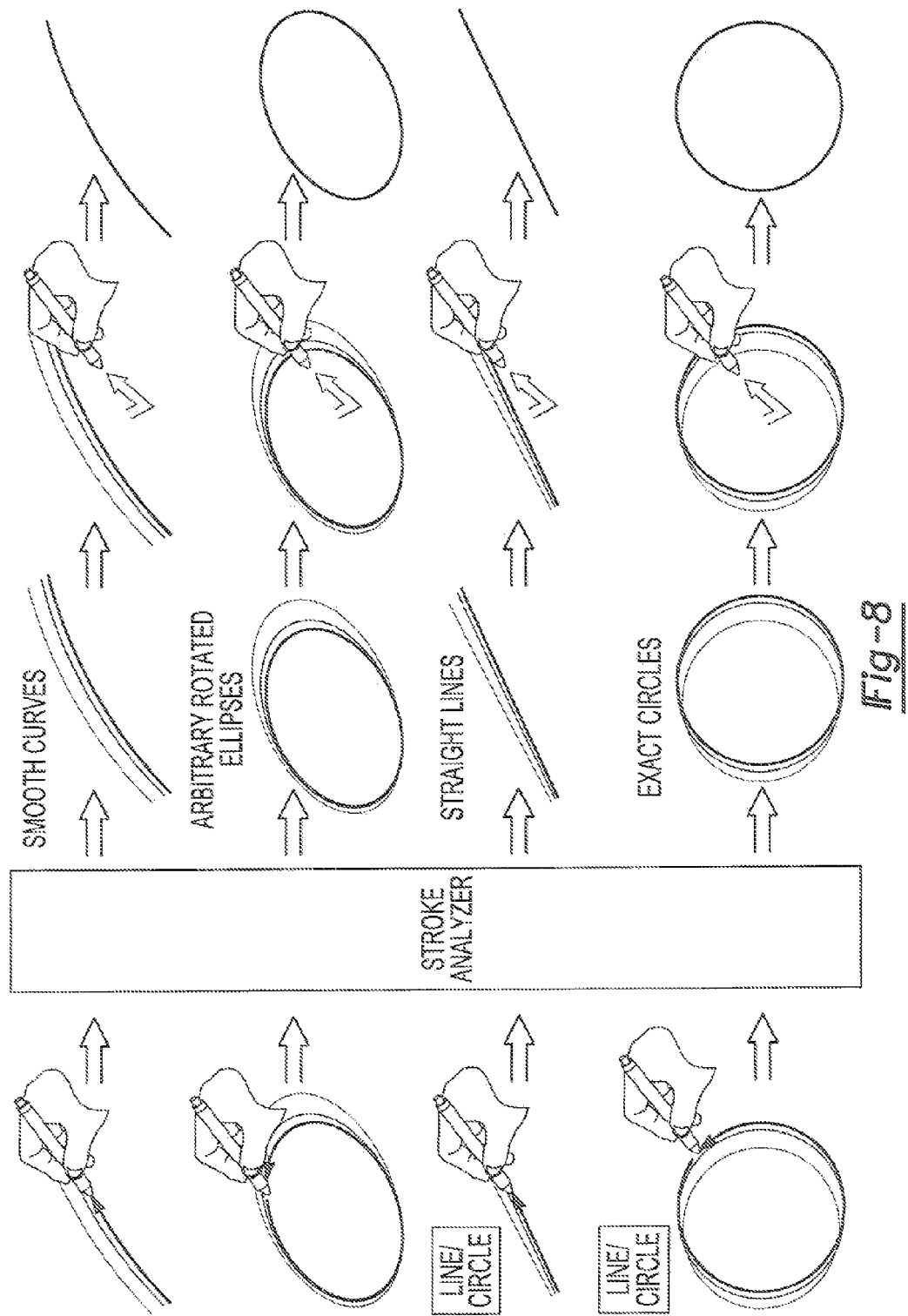

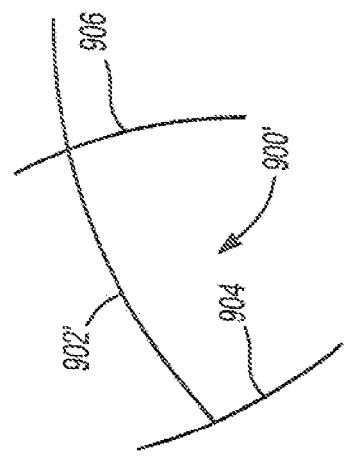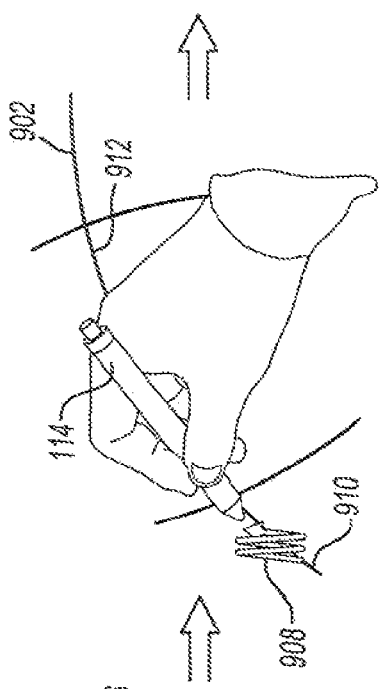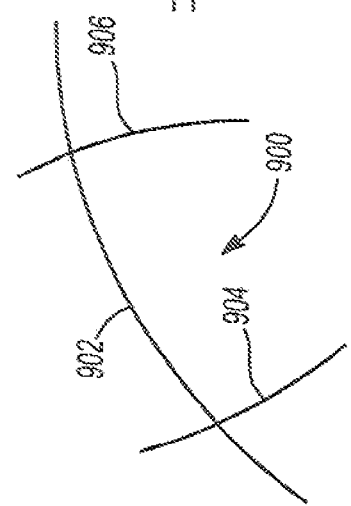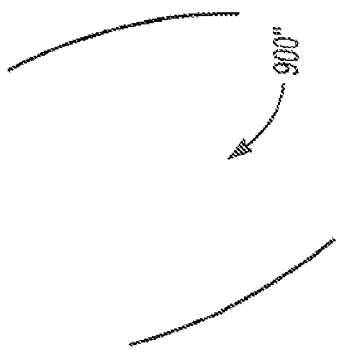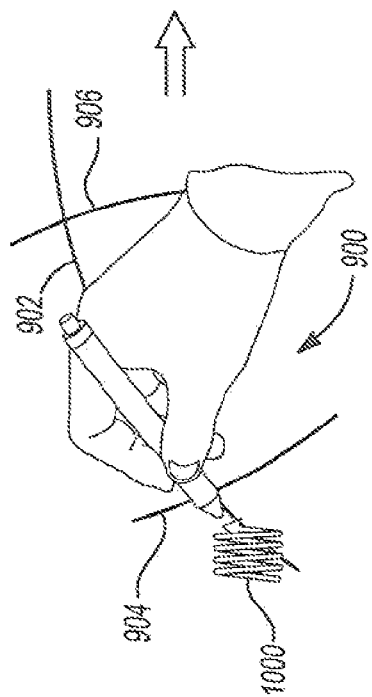

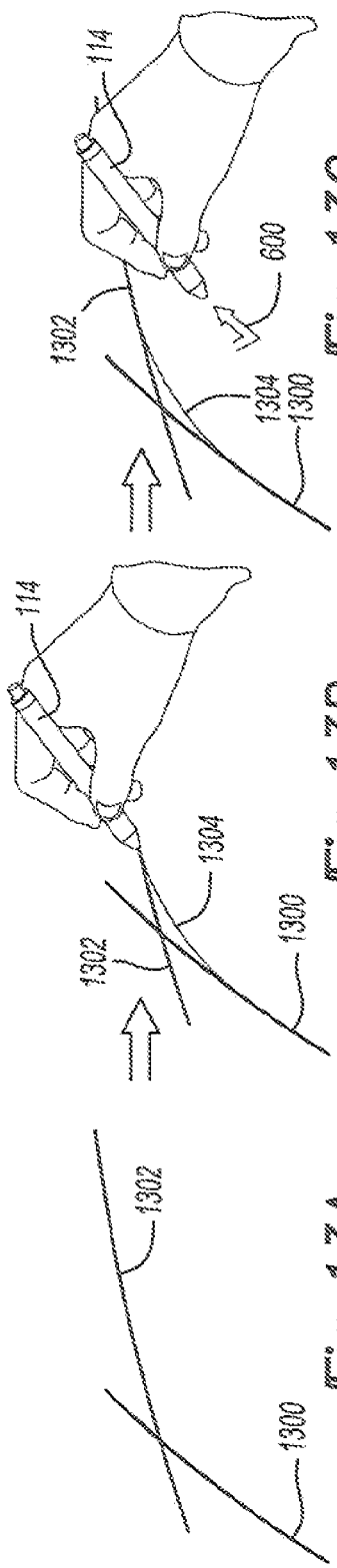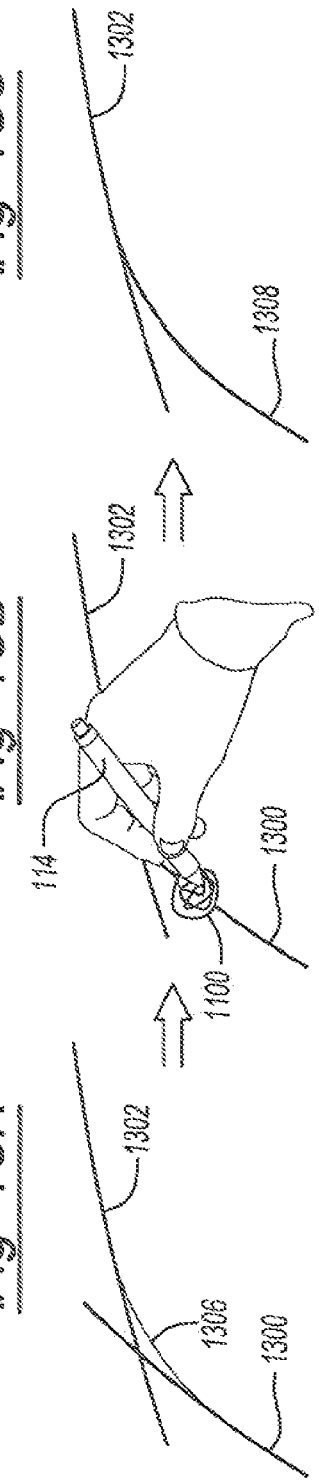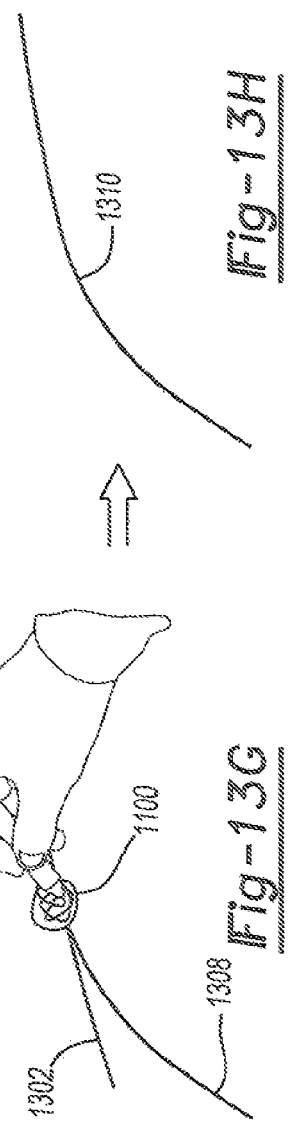

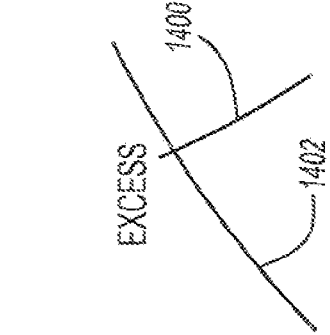
*Fig-14A*
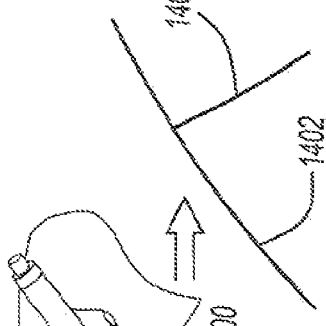
*Fig-14B*
*Fig-14C*
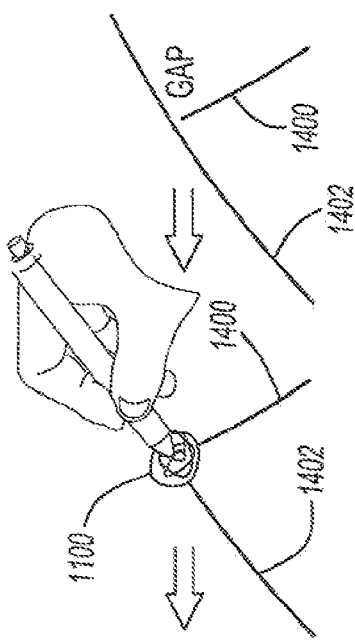
*Fig-14D*
*Fig-14E*
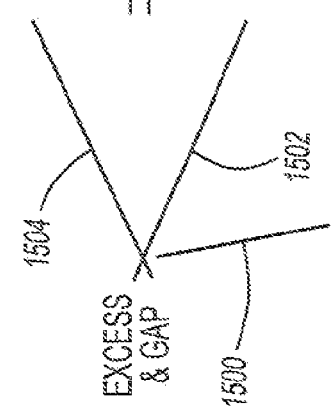
*Fig-15A*
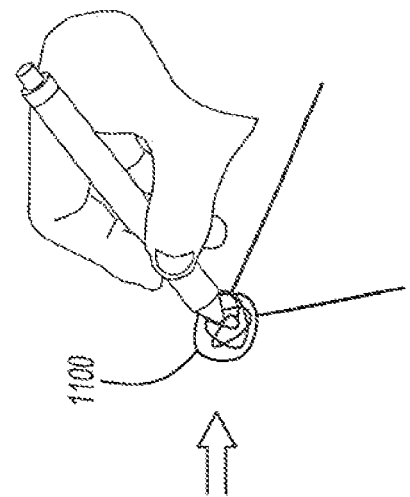
*Fig-15B*
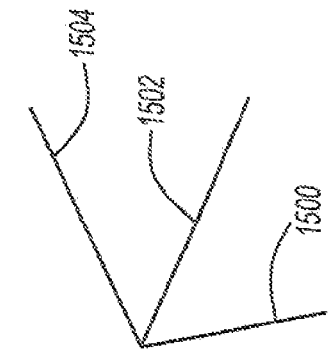
*Fig-15C*

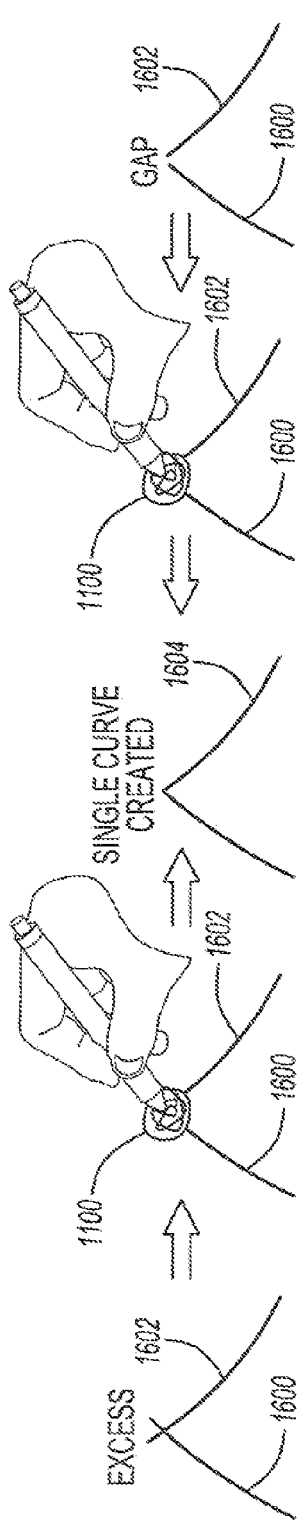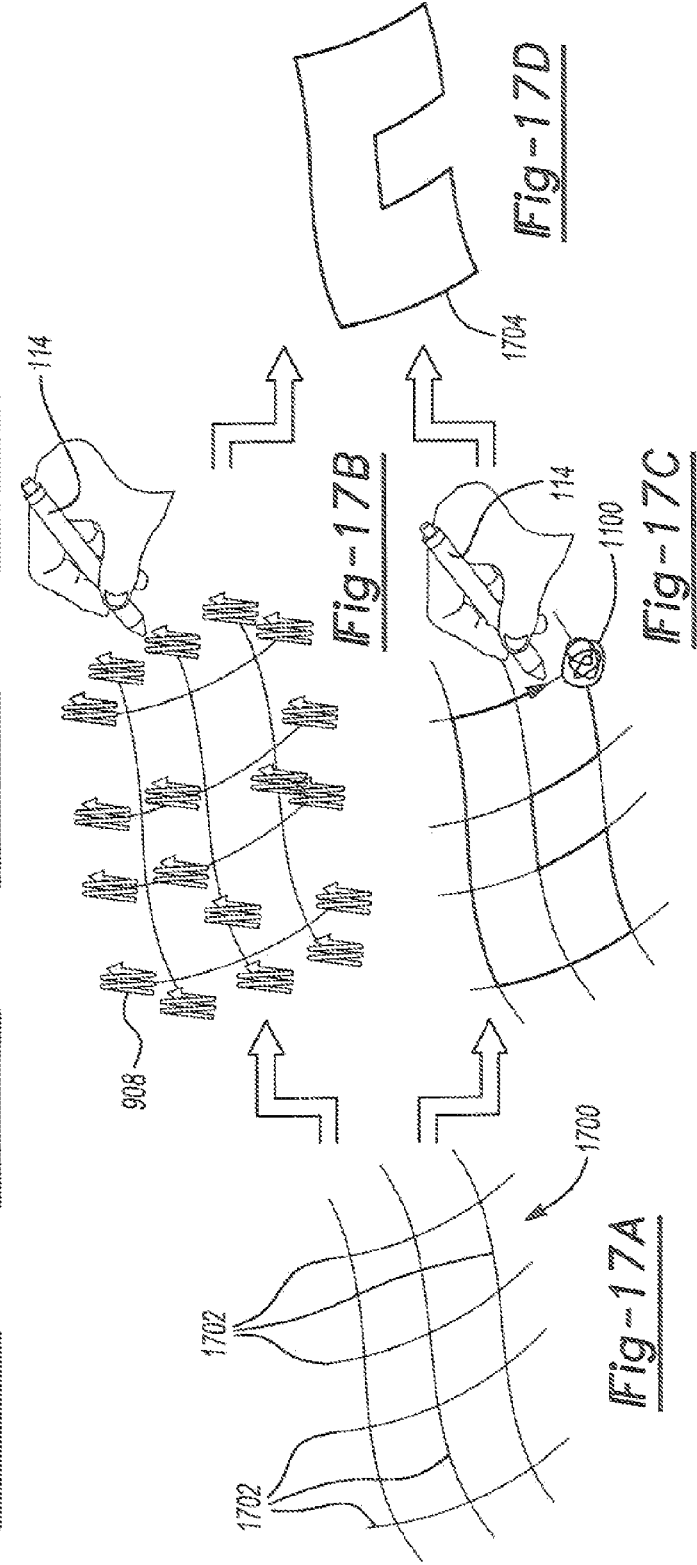

PEN-BASED 3D DRAWING SYSTEM WITH 3D ORTHOGRAPHIC PLANE OR ORTHOGRAPHIC RULED SURFACE DRAWING

CROSS-REFERENCE TO RELATED APPLICATIONS

This application claims the benefit of U.S. Provisional Patent Application Ser. No. 60/775,225 for "Pen-Based Drawing Software" filed on Feb. 21, 2006 and U.S. Provisional Patent Application Ser. No. 60/853,839 filed on Oct. 24, 2006 for "Pen-Based 3D Drawing Software." The disclosures of the above applications are incorporated herein by reference.

BACKGROUND OF THE INVENTION

Current drawing, photo editing and industrial design software requires manipulation with curve editing tools, which forces artists to work in terms of mathematical objects such as splines. Current 3D modeling software typically requires artists to understand, at least to some degree, the underlying mathematics and follow relatively complex technical procedures to create and manipulate 3D objects (e.g., 3D surface models).

Even for trained designers, it is a difficult task to draw a satisfactory freeform curve by applying only one pen stroke. Baudel, 7, 1994, "A Mark-Based Interaction Paradigm for Free-Hand Drawing," *Proceedings of UIST* 1994, ACM Press, 185-192) showed a method to partially modify an existing curve by overstretching on it, Bae, S.-H., Kim, W.-S., and Kwon, E.-S., 2003. Digital Styling for Designers: Sketch Emulation In Computer Environment," *Lecture Notes in Computer Science* (*Proceedings of international Conference on Computational Science and its Applications* 2003), 2689, 890-700 extracted a few simple element curves that automotive designers use generally, and suggested a method to get those curves as the weighted average of repetitive strokes.

To create a 3D curve from a 2D curve that the user draws, some assumptions or interface tricks are needed to infer the curve's depth information. The system of Cohen, J. M., Markosian, L., Zeleznik, B. C., Hughes, J. F., and Barzel, R., 1999, "An Interface for Sketching 3D Curves," *Proceedings of I3D* 1999, ACM Press, 17-22, creates 3D curves by having the user draw a curve first and then its shadow. In some systems the drawing order is flipped. (Grossman, T., Balakrishnan, R., Kurfenbach, G., Fitzmaurice, G., Khan, A., and Buxton, B., 2002, "Creating Principal 3D Curves with Digital Tape Drawing," *Proceedings of CHI* 2002, ACM Press, 121-128; Tsang, S., Balakrishnan, R., Singh, K., and Ranjan, A., 2004, "A Suggestive interface for Image Guided 3D Sketching," *Proceedings of CHI* 2004, ACM Press, 591-598) The user draws a curve on an orthographic plane, and then draws a second curve on the ruled surface that is extruded in the normal direction to the orthographic plane. Bae, S.-H., Kijima, R., and Kim, W. S., 2003, "Digital Styling for Designers: 3D Plane-Symmetric Freeform Curve Creation Using Sketch Interface," *Lecture Notes in Computer Science* (*Proceedings of International Conference on Computational Science and its Applications* 2003), 2889, 701-710, described a system to create symmetric 3D curves, if a user skilled in perspective drawing sketches a symmetric curve pair, the system samples 2D point pairs considering the vanishing point, and converts them Into 3D point pairs to reform a 3D point curve. Because most calculations are performed in 2D image space and the conversion from 2D to 3D is point-wise, the accuracy is not high and the resulting 3D point curve can be jagged. Karpenko, (X, Hughes, J. F., and Raskar, R., 2004, "Epipolar Methods for Multi-View Sketching," *Proceedings of the* 2004 *EUROGRAPHICS Workshop on Sketch-Based Interfaces and Modeling,* 167-173, attempted a multi-view curve sketch. It is conceptually obvious, but not easy to use because an intermediate planar curve created from a curve sketched on a first view is difficult for the user to correlate to the second view.

Geometric modeling is a highly interactive task that requires the user to perform frequent navigation and operations on geometric and graphical objects. Current commercial 3D modeling software provides complicated user interfaces having menus and tool pallets. The user needs to have a good understanding of underlying mathematics and has to follow technical operational procedure. Zeleznik, R. C., Herndon, K. P., and Hughes, J. F. 1998, "SKETCH: An Interface for Sketching 3D Scenes," *Proceedings SIGGRAPH* 96, ACM Press, 163-170 and Igarashi, T., Mafsuoka, S., and Tanaka, H., 1999, "Teddy: A Sketching Interface for 3D Freeform Design," *Proceedings of ACM SIGGRAPH* 99, ACM Press, 409-418, showed a new possibility of simple and intuitive user interfaces for geometric modeling by introducing pen gestures.

The most basic problem in gesture-based user interfaces is to distinguish command strokes from draw strokes. In the many publications, the command and draw modes are separated to avoid ambiguities of stroke interpretation. A common way is to use pen barrel buttons, keyboard buttons, and specialized mode switches. Some studies employed pen gestures such as the double tap (Moran, T. P., Chiu, P., and Van Melle, W., 1997. "Pen-Based interaction Techniques for Organizing Material on an Electronic Whiteboard," *Proceedings of UIST* 1997, ACM Press, 45-54); flick (Zeleznik, R. and Miller, T. 2006, "Fluid Inking: Augmenting the Medium of Free-Form Inking with Gestures," *Proceedings of the* 2006 *Conference on Graphics Interface,* ACM Press, 155-162); and press and hold (Buxton, W., 1990, "A Three-State Model of Graphical Input," *Proceedings of IFIP Tc13 International Conference on Human-Computer Interaction,* North-Holland, 449-456) Saund, E, and Lank, E., 2003, "Stylus input and Editing Without Prior Selection of Mode," *Proceedings of UIST* 2003, ACM Press, 213-216, suggested inference and user mediation. Ramos, G., Boulos, M., and Balakrishnan, R., 2004, "Pressure Widgets," *Proceedings of CHI* 2004, ACM Press, 487-494, and Tsang, S., Balakrishnan, R., Singh, K., and Ranjan, A., 2004, "A Suggestive Interface for Image Guided 3D Sketching," *Proceedings of CHI* 2004, ACM Press, 591-598, explored using pressure sensing to distinguish between gesture strokes and draw strokes.

Considering the complexity of geometric modeling, it is not possible to operate every function of a modeling system using only pen gestures. Too many gestures and complicated gesture grammar may confuse the user without providing hints about how to interact with the computer. Gesture-based interfaces are inherently not self-disclosed unlike conventional graphical user interfaces known as WIMP GUIs. On-screen menus such as the marking menus (Kurtenbach, G. and Buxton, W., 1993, "The Limits of Expert Performance Using Hierarchic Marking Menus," *Proceedings of CHI* 1993, ACM Press, 482-487), FlowMenu (Guimbretiére, F, and Winograd, T., 2000, "FlowMenu: Combining Command, Text, and Data Entry," *Proceedings of UIST* 2000, ACM Press, 213-218), tracking menus (Fitzmaurice, G., Khan, A., Pieké, R., Buxton, B., and Kurtenbach, G., 2003, "Tracking Menus," *Proceedings of UIST* 2003, ACM Press, 71-79) can be a complement to gesture-based interfaces.

Rather than "chicken scratch" style sketches, professional automotive designers express shapes with simple controllable curves having a good flow by "drawing from the shoulder." Those curves generally have no inflection point or at most one. (Bae, S.-H., Kim, W.-S., and Kwon, E.-S., 2003, "Digital Styling for Designers: Sketch Emulation in Computer Environment," *Lecture Notes in Computer Science* (*Proceedings of International Conference on Computational Science and its Applications* 2003), 2669, 690-700) They draw these lines very light at first, and then darken them up when the lines form a satisfactory shape. (Taylor, T., and Hallett, L., 1996, "How to Draw Cars Like a Pro.," Motorbooks international) Curves having complicated convexity changes are created by connecting simple curves with smooth transitions. While sketching, they rotate paper from time to time to stay within an articulation comfort range. Drawing and paper rotation are subconsciously Integrated. (Fitzmaurice, G, W., Balakrishnan, R., Kurtenbach, G., and Buxton, B., 1999, "An Exploration into Supporting Artwork Orientation in the User Interface," *Proceedings of CHI* 1999, ACM Press, 187-174)

Automotive designers take considerable care in setting up an initial perspective frame and continuously try to keep their sketches in correct perspective and proportion. Vanishing points, horizon lines, ground plane, center plane, box representing the outside dimensions of the car, ellipses with axle lines are used to establish a perspective view. (Robertson, S., With The Hot Wheels™ Designers, 2004, "How to Draw Cars the Hot Wheels™ Way," MBI). Flipping paper and drawing on the back of the paper is a common technique to detect distortion and inaccuracy with a "fresh eye." Some designers work with an underlay of a computer-generated perspective grid with wheels, 3D rendered image of existing cars, or package drawings where key dimensions and engineering hard points are indicated. On the other hand, they sometimes exaggerate and distort perspective and proportion intentionally to Increase the appeal of particular aspects of a design (they called it "cheating").

Raster-type painting software allows designers to make the best use of their drawing skills. Furthermore, it provides many advantages that are not found in using traditional media including undoing actions, easy storing and retrieving results, working with unlimited layers and special digital effects. But, imperfect eye-hand coordination is a problem to some when using the standard graphics tablet devices that are not integrated with the display device physically. With no expense for undo, it increases the designer's tendency of expecting a "happy accident" of getting a satisfactory curve by just repeating a stroke and undo. Some software provides the canvas rotation mode that is invoked by pressing a button on the keyboard. However, most designers do not use the function and draw curves by twisting their head and body. As a result some designers feel they can not duplicate the quality of their paper strokes using a tablet.

In using painting programs, vector-type curves like NURBS curves are used as a supporting geometry that define snapping sweeps to control brushing or masks for brushing and gradation in a specified area. Creation of the snapping sweeps and masks require time-consuming, tedious manipulation of control points as in using vector illustration tools.

SUMMARY OF THE INVENTION

In an aspect, the present invention provides a pen-based drawing system to allow users, such as artists, graphic designers and illustrators, and the like, to create accurate curve models by sketching. A tool set implemented in software that runs on a computer system combines paper sketch metaphors and a minimalist gesture set. This tool set provides an environment where the artists can focus on the creative task at hand rather than the details of operating software.

In an aspect, a pen-based drawing system is provided that allows users to create and edit three dimensional ("3D") models by sketching.

In an aspect, a pen-based drawing system is provided that recognizes pen gestures for editing and navigation.

In an aspect, a pen-based drawing system is provided that recognizes pen gestures for commands having highest frequency without switching from a drawing mode and recognizes pen gestures for commands having higher frequency in a quasi-mode where a key on a keyboard or a button on a pen is held while the pen gesture is made. In an aspect, the commands having higher frequency that are recognized in the quasi-mode are canvas and camera control commands.

In an aspect, a pen-based drawing system is provided that recognizes pen gestures for commands having mid frequency with a check menu.

BRIEF DESCRIPTION OF THE DRAWINGS

FIG. 8 shows an aspect whereby a check gesture is used to instruct the software to settle the stroke vector curves;

FIG. 8 shows an aspect whereby curve types are automatically recognized;

FIGS. 9A-9C show an aspect whereby partial curve deletion is achieved through a partial curve "scratch-out" gesture;

FIGS. 10A-10B show an aspect where deletion of a whole curve is achieved through a whole curve "scratch-out" gesture;

FIGS. 13A-13H show an aspect whereby tangential concatenation of curves to generate a smooth corner between them is achieved through the "dot" gesture;

FIGS. 14A-14E show an aspect where end-point snapping of a curve is achieved through the "dot" gesture;

FIGS. 15A-15C show an aspect where end-point snapping of multiple curves is achieved through the "dot" gesture:

FIGS. 16A-16E show an aspect whereby angular concatenation of two curves is achieved through the "dot" gesture;

FIGS. 17A-17D show an aspect whereby repetitive "scratch-out" gesturing can be avoided by a use of the "dot" gesture and tracing a contour;

DETAILED DESCRIPTION OF THE EXEMPLARY EMBODIMENTS

Figure 1:
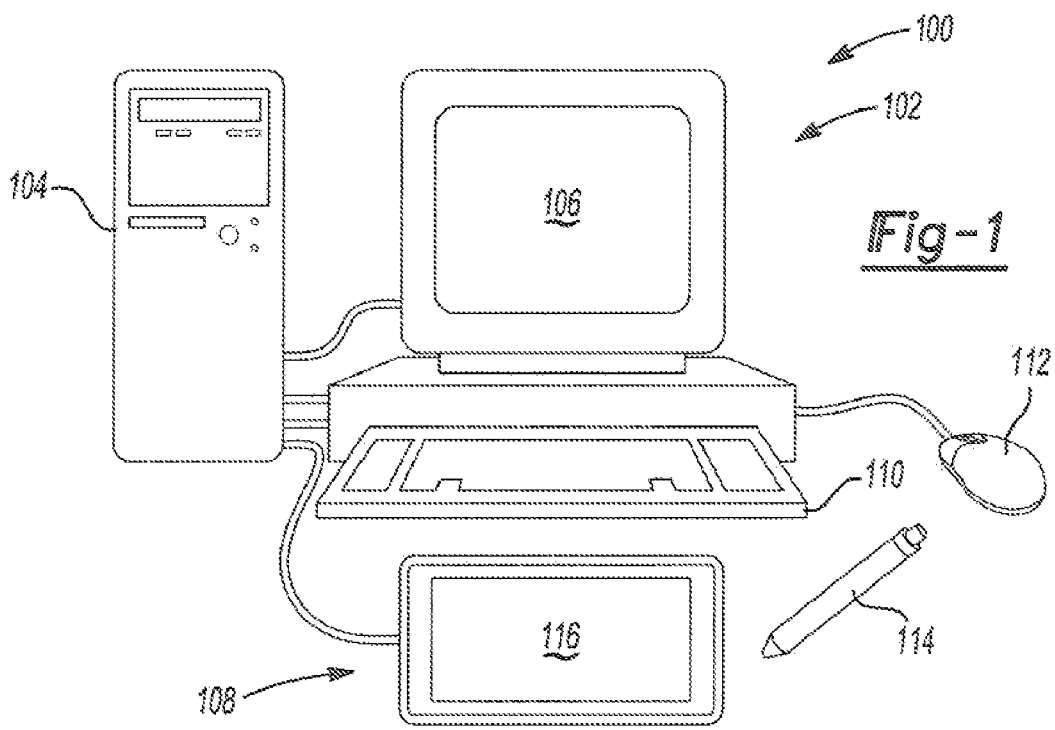
FIG. 1 is a block diagram of a pen-based drawing system in accordance with an aspect of an exemplary embodiment.

Referring to FIG. 1, a pen-based drawing system 100 is shown according to a first exemplary embodiment. This system allows users to create curve models by hand sketching.

Pen-based drawing system 100 includes a computer system 102 having a computer 104 with a display (such as a monitor or screen) 108 and an pen input device 108 coupled to computer 104. Computer system 102 may also illustratively have a keyboard 110 and a mouse 112 coupled thereto. Computer 104 may illustratively be a general purpose computer having components typically included in a general purpose computer, such as a CPU, memory, a hard drive, and the like. Computer 104 may illustratively be a personal computer, a notebook computer, a tablet PC, or a work station.

Pen input device 108 may illustratively have a pen stylus 114 (sometimes referred to herein as pen 114) and a sketch tablet 116 on which a user can "draw" using pen 114. Pen input device 108 captures the strokes drawn by a user on sketch tablet 116 using pen 114 and inputs them into computer 104. in an illustrative aspect, the curve model generation software is a Java application (J2SE™ 5.0, Java 3D™ 1.3.2, JOGL API), computer 104 is illustratively a desktop computer (Pentium® 4, 3.20 GHz, 3.00 GB RAM), and pen input device 108 is a WACOM Intuos® 3 graphics tablet (9"×12") and/or a WACOM Intuos® 2 graphics tablet (12"× 19"). It should be understood that pen input device 108 can be any device that captures strokes drawn by a user and inputs them into a computer.

Pen-based drawing system 100 includes curve model generation software that runs on computer 104 that allows a user to create curves (both 2D and 3D) by sketching using pen input device 108. It also allows the user to edit the curves and navigate using pen gestures, as described in more detail below. For example, in an aspect, a user creates a curve using multi-stroke vector curve creation, as described in more detail below, by repetitively sketching curve strokes on sketch tablet 116 using pen 114 that are input into computer system 102 by pen input device 108, and then instructing the computer system 102 to settle the plurality of curve strokes into a single curve.

The curve model generation software operating on computer system 102 takes the plurality of curve strokes input into computer system 102 and generates a curve model therefrom. It also recognizes pen gestures as commands. As used herein, the term "gesture" or "pen gesture" means a pen stroke or a pen motion that is recognized by the curve model generation software running on computer 104 as a command, such as an edit command or navigation command, as discussed in more detail below.

In an aspect, a sketch-based vector curve creation method is provided by combining the multi-stroke method (described below) with gesture-based curve editing, in an aspect, easy-to-use navigation techniques are provided so that designers can quickly search a 2D area to draw comfortably and a 3D view to model shape easily. In an aspect, a new algorithm for mirror symmetric 3D curve sketching is provided and a set of 3D curve sketch methods are implemented to give designers a chance to choose the best method depending on what they want to create. In an aspect, various perspective hints and engineering constraints are provided to help designers sketch easily. All the commands are classified in terms of frequency (Table 1). For the most frequent commands related to drawing, a small number of pen gestures are used to execute the commands without a mode change from the drawings mode in order to allow designers to stay focused on their creative work. In some cases the user's intention is clear, and the curve model generation software executes commands automatically to accelerate the work flow. For navigation that is also a frequent operation, a few motion gestures are used in the controlled quasi-modes invoked by pressing pen barrel buttons. For less frequent commands, such as changing 2D/3D and selecting a 3D curve creation method, the user pops up an on-screen menu and chooses a command. For infrequent commands, conventional menus are used.

TABLE 1

Command classification based on frequency

| Frequency | Execution | Examples |
|---|---|---|
| Highest | Gesture (draw mode) | Curve settle, erase, tie, select, undo/redo |
| Higher | Gesture (quasi-mode) | Canvas/camera control |
| Middle | Check menu | Curve creation method change |
| Low | Menu | File open/save/new, engineering constraint change |

Figure 2:
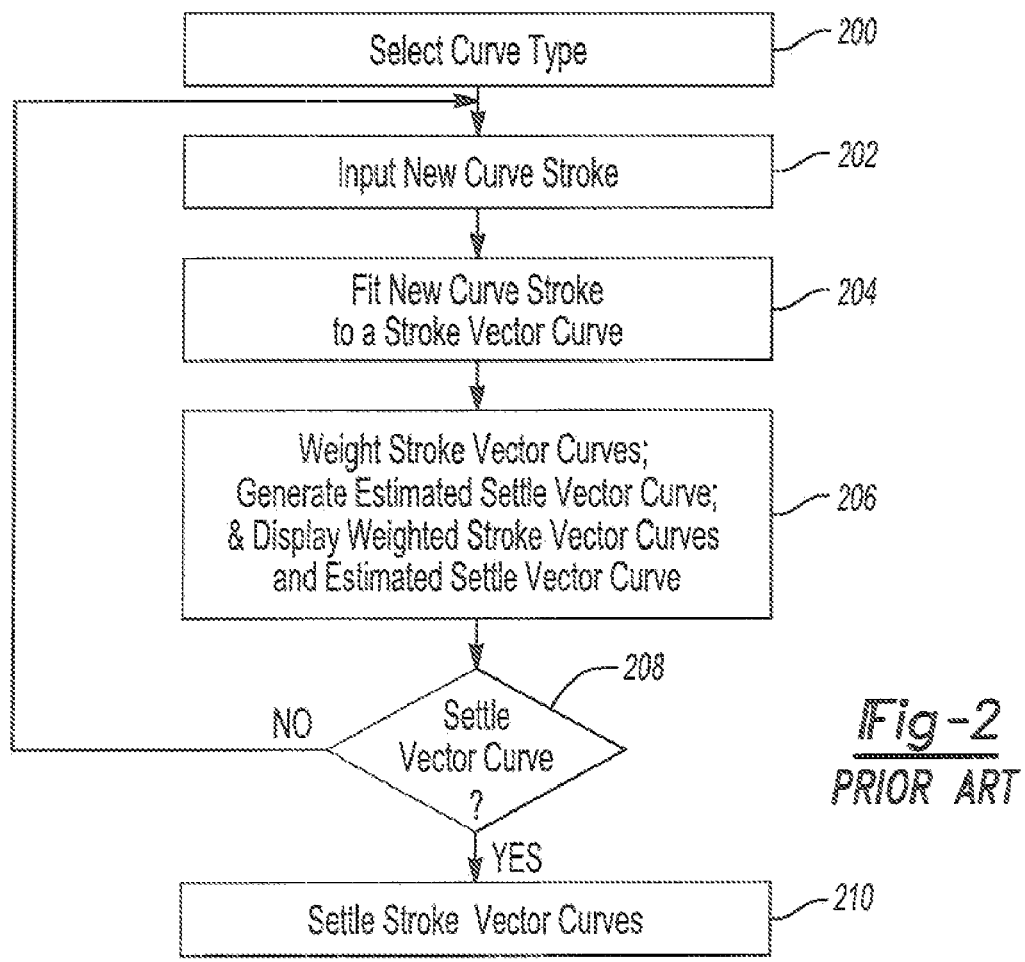
FIG. 2 is a flow chart of multi-stroke vector curve creation in accordance with an aspect of an exemplary embodiment whereby a 2D vector curve is created through repeated curve strokes and a command from a user to settle the curve.
Figure 3:
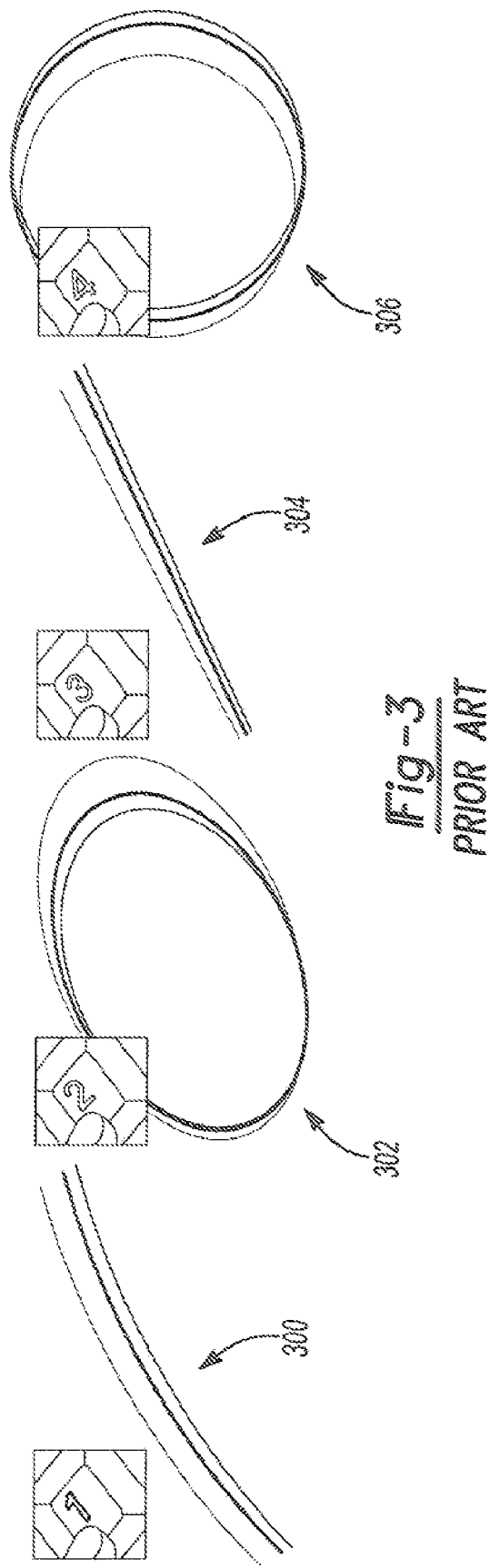
FIG. 3 shows an aspect whereby a keyboard command is used to select the curve type.

FIG. 2 is a high level flow chart of the multi-stroke vector curve generation described in Bae, S.-H., Kim, W. S., and Kwon, E.-S., "Digital Styling for Designers: Sketch Emulation In Computer Environment," *Lecture Notes in Computer Science*" (*Proceedings of International Conference on Computational, Science and its Applications* 2003), 2889, 890-700 which is incorporated by reference herein in its entirety. This multi-stroke vector curve generation is illustratively implemented in the curve model generation software. With reference to FIG. 2, a user first selects at 200 the type of curve the user wants to generate. With reference to FIG. 3, these curve types may include a smooth curve 300, an arbitrary rotated ellipse 302, a straight line 304 and an exact circle 308. It should be understood that these curve types can include other types of curves. In an aspect, the user illustratively selects the curve type with keyboard 110 as shown in FIG. 3 by pressing a key associated with the desired curve type, such as "1" for a smooth curve 300, "2" for an arbitrary rotated ellipse 302, "3" for a straight line 304, and "4" for an exact circle 306.

The user then sketches a curve stroke on sketch tablet 116 with pen 114 (FIG. 4) which is input into computer 104 at 202 (FIG. 2). This curve stroke is fit to a stroke vector curve at 204. At 208, an estimated settle curve (which is also a vector curve) is generated and the stroke vector curves and estimated settle curve are displayed. At 208, the user selects whether to settle the stroke vector curves, if the user selects not to settle the stroke vector curves, the user sketches another curve stroke which is input at 202 into computer 102, and steps 204, 208 and 208 are repeated. These vector curves are illustratively non-uniform rational B splines, commonly known as NURBS.

Figure 4:
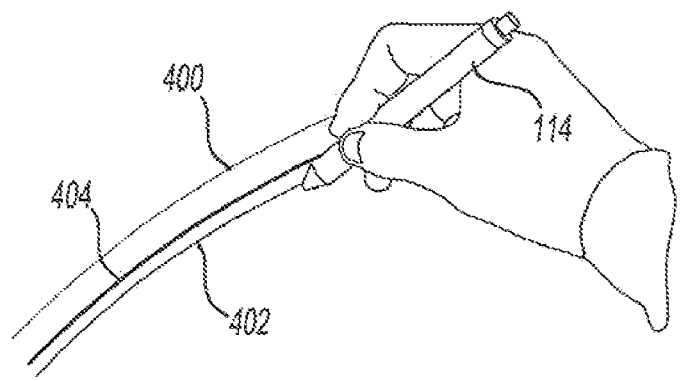
FIG. 4 shows an aspect whereby the stroke vector curves are settled by taking a weighted average of the stroke vector curves.

In an aspect, the stroke vector curves are weighted when they are displayed at 208 with the last drawn stroke vector curve, such as stroke vector curve 402 in FIG. 4, having the highest weight and darkest color) and the first drawn stroke vector curve, such as stroke vector curve 400, having the lowest weight and lightest color. This visual feedback varies the transparency (or darkness) of each stroke vector curve according to its drawing order, which reflects its importance.

Figure 5:
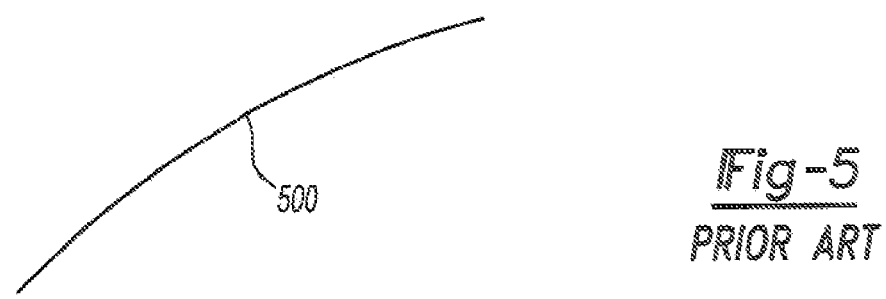
FIG. 5 shows the vector curve settled by taking the weighted average of the stroke vector curves.

In an aspect, the estimated settle curve is determined by using a weighted average of the stroke vector curves, with the last drawn stroke vector curve having the highest weight and the first drawn stroke vector curve having the lowest weight. The older stroke vector curves thus have less effect on the settle curve as the number of stroke vector curves increase. With reference to the example of FIG. 4, estimated settle curve 404 is closer to last drawn stroke vector curve 402 than to first drawn stroke vector curve 400. The weighted average approach assumes that a user improves the curve with each repetition of the curve stroke so that the last drawn curve stroke is given the highest weight. When the user settles the curve, the estimated settle curve determined using the weighted average of the stroke vector curves becomes the settled curve, such as settle vector curve 500 (FIG. 5).

In an aspect, the estimated settle curve, such as estimated settle curve 404, is displayed in a different color than the stroke vector curves 400, 402 drawn by the user. This visual feedback distinguishes the estimated settle vector curve from the stroke vector curves the user has drawn to help the user to determine when to stop sketching and settle the stroke vector curves.

Figure 6:
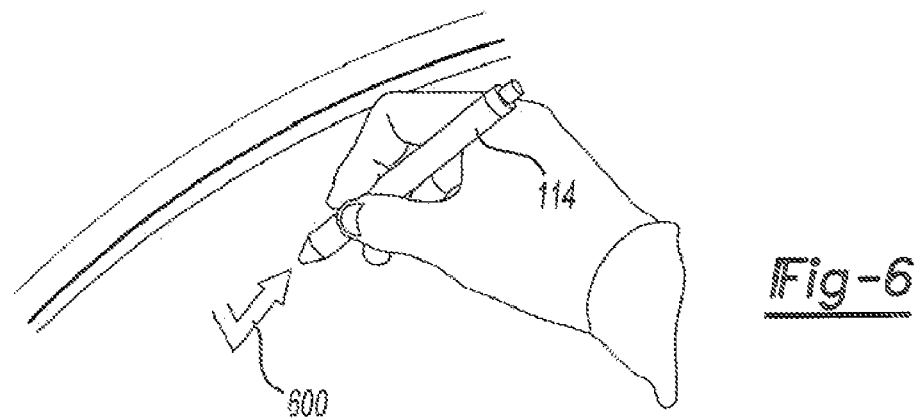

When the user commits to settle the stroke vector curves at 208, the user may do so by a keystroke on keyboard 110, such as by pressing the "5" key. With reference to FIG. 6, in an aspect, the user may settle the stroke vector curves by applying a check gesture, such as check mark shaped stroke 800, with pen 114. Curve settlement with a check gesture made with pen 114 allows the user to focus on sketching without being distracted by menus, icons, or buttons when the user decides to settle a set of stroke vector curves.

Figure 7:
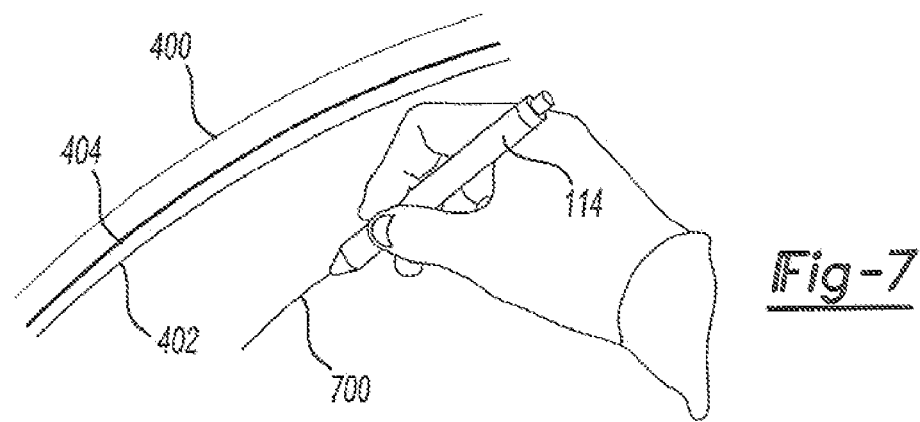
FIG. 7 shows an aspect whereby a command to settle the curves is recognized when the user starts a new curve.

In an aspect, the user may settle the stroke vector curves by starting a distinct curve, such as distinct curve 700 shown in FIG. 7. This settles as a vector curve the previously drawn stroke vector curves, such as stroke vector curves 400, 402 as an example.

In an aspect, the trajectory of pen 114 may be analyzed by the curve model generation software running on computer 104 to select the curve type, as illustrated in FIG. 8. in an aspect, a modifier key may be used to distinguish between curve types that are sketched with similar curve strokes. For example, the "alt" key on the keyboard may be used to distinguish between smooth curves and straight lines, and between ellipses and circles. That is, when the user sketches a stroke without pressing the "alt" key, the stroke is recognized as a smooth curve or an ellipse, depending on the pen trajectory. When the user sketches a stroke with the "alt" key pressed, the stroke is recognized as a straight line or circle, depending on the pen trajectory.

Figure 43:
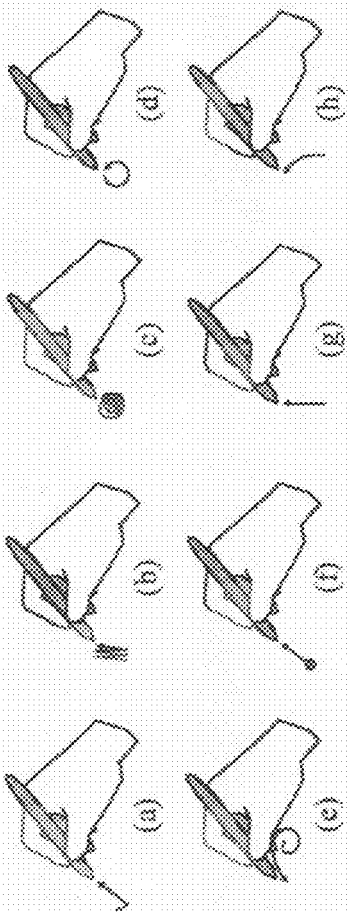
FIGS. 43(a)-(h) show illustrative pen gestures that are recognized as commands in accordance with an aspect.

With reference to FIGS. 43(*a*)-(*h*), in an aspect pen gestures are used for curve editing and navigation. Except for the pen gestures used in the navigation quasi-modes, all the pen gestures are recognized in the same mode of drawing. Thus their strokes should be clearly distinguished from relatively smooth draw strokes. A check gesture (FIG. 43(*a*) is a kind of delimiter, it is used to conclude multi-strokes input or make an on-screen menu appear. A scratch-out gesture (FIG. 43(*b*)) is used for deleting geometric objects in part or whole as in many publications. (Baudel, T., 1994, "A Mark-Based Interaction Paradigm for Free-Hand Drawing," *Proceedings of UIST* 1994, ACM Press, 185-192; Igarashi, T., Matsuoka, S., Kawachiya, S., and Tanaka, H., 1997, "Interactive Beautification: A Technique for Rapid Geometric Design," *Proceedings of UIST* 1997, ACM Press, 105-114; Igarashi, T., Matsuoka, S., and Tanaka, H., 1999, "Teddy: A Sketching Interface for 3D Freeform Design," *Proceedings of ACM SIGGRAPH* 99, ACM Press, 409-418; Tsang, S., Balakrishnan, R., Singh, K., and Ranjan, A., 2004, "A Suggestive Interface for Image Guided 3D Sketching," *Proceedings of CHI* 2004, ACM Press, 591-598; Zeleznik, R. and Miller, T., 2008, "Fluid Inking: Augmenting the Medium of Free-Form Inking with Gestures," *Proceedings of the 2006 Conference on Graphics Interface*, ACM Press, 155-162.) The dot gesture (FIG. 43(*c*)), which is a small and (almost) solid mark whose outer shape is circular, is used to tie up different curves and to define a position on a curve. The circle gesture (FIG. 43(*d*)) is a (almost) closed circular stroke that is used to select a curve or an intersection point of curves. The counterclockwise spiral gesture (FIG. 43(*e*)) and clockwise spiral gestures are used for undo and redo, respectively. The use of the flick gesture (FIG. 43(*f*)), linear motion gesture (vertical, horizontal, diagonal) (FIG. 43(*g*)), and circular motion gesture (FIG. 43(*h*)) is limited in the quasi-modes for navigation because their strokes are otherwise difficult to distinguish from draw strokes otherwise. The two motion gestures (linear and circular) are recognized in the middle of stroking whereas all the other gestures are recognized when the tip of pen 114 is up.

In an aspect, by giving variation to the shape of the scratch-out gestures, the user can perform different curve deleting operations with one pen gesture while still keeping a common metaphor for erasing.

In an aspect, a curve can be trimmed or partially deleted through the use of a partial curve "scratch-out gesture," which is a "scratch out" pen stroke as shown in FIGS. 9A-9C. With reference to FIG. 9A, a shape 900 has three curves 902, 904, 908. With reference to FIG. 9B, a user deletes a portion 910 of curve 902 by applying a partial curve "scratch-out" gesture 808 with pen 114 on the portion 910 of curve 902 to be deleted. This deletes portion 910 of curve 902 with the resulting shape 900' and modified curve 902' shown in FIG. 9C. The curve model generation software running on computer 104 determines which portion of the curve to delete based on the portion of the curve to which the partial curve scratch-out gesture 908 is applied as it relates to where that curve intersects with other curves, in the example shown in FIGS. 9A-9C, the partial curve scratch-out gesture 908 is applied to the portion 910 of curve 902 to the left of where curve 902 intersects with curve 904, so the curve model generation software deletes portion 910 of curve 902. If, for example, the partial curve scratch-out gesture 908 was applied to the portion 912 of curve 902 between where curve 902 intersects with curves 904, 906, the curve model generation software would delete portion 912 of curve 902. Multiple repetitions of the partial curve "scratch-out" gesture may be avoided, for example, through use of an exclusive erase feature described below with reference to FIGS. 17A-17D.

in an aspect, a curve can be completely deleted or erased through the use of a whole curve "scratch-out" gesture, as shown in FIGS. 10A-10B. With reference to FIG. 10A, a whole curve scratch-out gesture 1000 is applied to curve 902. The resulting shape 900" with curve 902 being completely deleted is shown in FIG. 10B. Partial curve scratch-out gesture 908 and whole curve "scratch-out" gesture 1000 may be the same generally type of gesture, but have different characteristics. For example, in an aspect, whole curve scratch-out gesture 1000 includes more transitions than partial curve scratch-out gesture 908 and the curve model generation software determines whether a scratch-out gesture is partial curve scratch-out gesture 908 or whole curve scratch-out gesture 1000 by the number of corners in the scratch-out gesture, it should be understood that other distinctions can be used, such as the length of the scratch-out gesture, pen pressure, or the like.

Figure 11A:
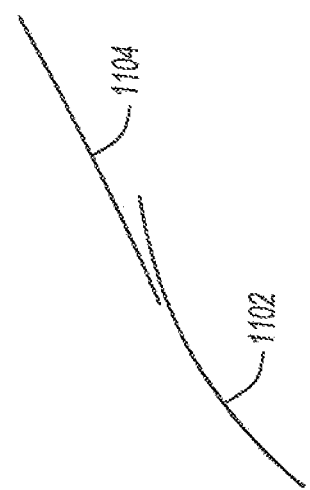
FIGS. 11A-11C show an aspect whereby tangential concatenation of two curves is achieved through a "dot" gesture.
Figure 11B:
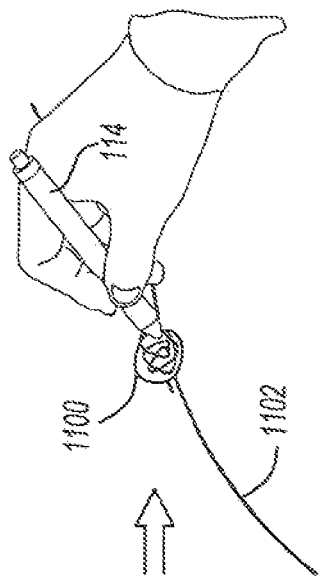
Figure 11C:
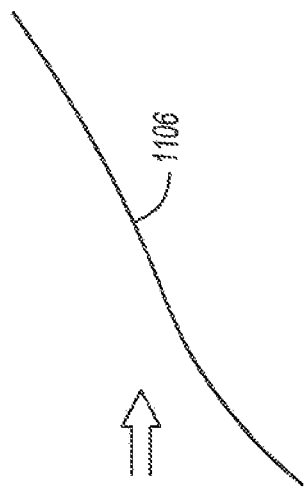
Figure 12A:
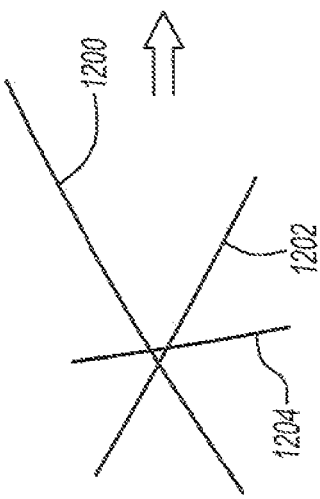
FIGS. 12A-12C show an aspect whereby tightening of intersections of curves is achieved through a "dot" gesture.
Figure 12B:
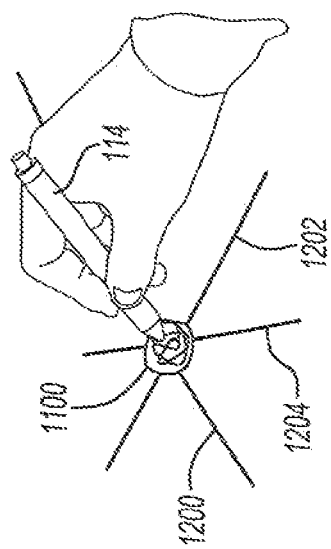
Figure 12C:
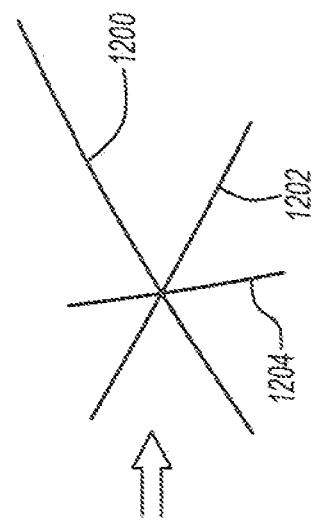

In an aspect, a model scratch out gesture is provided. When the model scratch out gesture is applied, all the objects on the canvas, which is displayed on display 106, are erased. The model scratch out gesture may illustratively be a whole curve scratch out gesture whose bounding box is bigger than a specified size, such as seventy-five percent of the size of the canvas displayed on display 106. The model scratch out gesture may also or alternatively be a whole curve scratch out gesture applied to an empty portion of the canvas.

in an aspect, a "dot" gesture is provided in an exemplary aspect for a plurality of functions such as for a model having a plurality of vector curves, including tying curves, creating common intersections, creating a corner fillet, or end-point snapping two or more curves. As described above, the dot gesture is a small and (almost) solid mark whose outer shape is circular. FIGS. 11A-11C show the use of dot gesture 1100 for tangential concatenation of two curves 1102, 1104. The dot gesture 1100 is applied by the user with pen 114 where the two curves 1102, 1104 overlap, resulting in the tangential concatenation of the two curves 1102, 1004 which results in curve 1108. FIGS. 12A-12C show the use of dot gesture 1100 to "tighten" the intersections between three or more curves, such as curves 1200, 1202, 1204. As can be seen in FIG. 12A, the three curves 1200, 1202, 1204 do not intersect each other at the same point. Dot gesture 1100 is applied by the user with pen 114 as shown in FIG. 12B resulting in the intersections of the curves 1200, 1202, 1204 being tightened so that they intersect at the same point as shown in FIG. 12C. The curve model generation software utilizes context dependent command recognition to determine whether to tangentially concatenate two curves or tighten the intersections of three or more curves when dot gesture 1100 is applied. When dot gesture 1100 is applied where two curves overlap, tangential concatenation of the two curves results. When dot gesture 1100 is applied where three or more curves intersect in close proximity, the intersections of the three curves is tightened so that the three curves intersect at one point.

In an aspect, the dot center gives reference to decide the connecting point. Thus, the user has control of the position and tangent condition when connecting two curves. For tangential concatenation of two curves, there exist several options about the position and slope of the resulting curve at the connecting point. According to an aspect, the earlier created curve ("C1") has a higher priority. The later created curve ("C2") is moved to C1 so that the resulting connection point ("P") of the two curves C1, C2 is the point on C1 ("P1") that is closest to the dot center, and the common slope at P is the tangent vector at P1 on C1, Conversely, in another aspect, the later created curve ("C2") is given the higher priority so that the resulting connection point P of the two curves C1, C2 is the point on C2 ("P2") closest to the dot center, and the common slope at P is the tangent vector at P2 on C2. In another aspect, both curves C1 and C2 get equal priority, thus setting P somewhere between C1 and C2.

Figure 29:
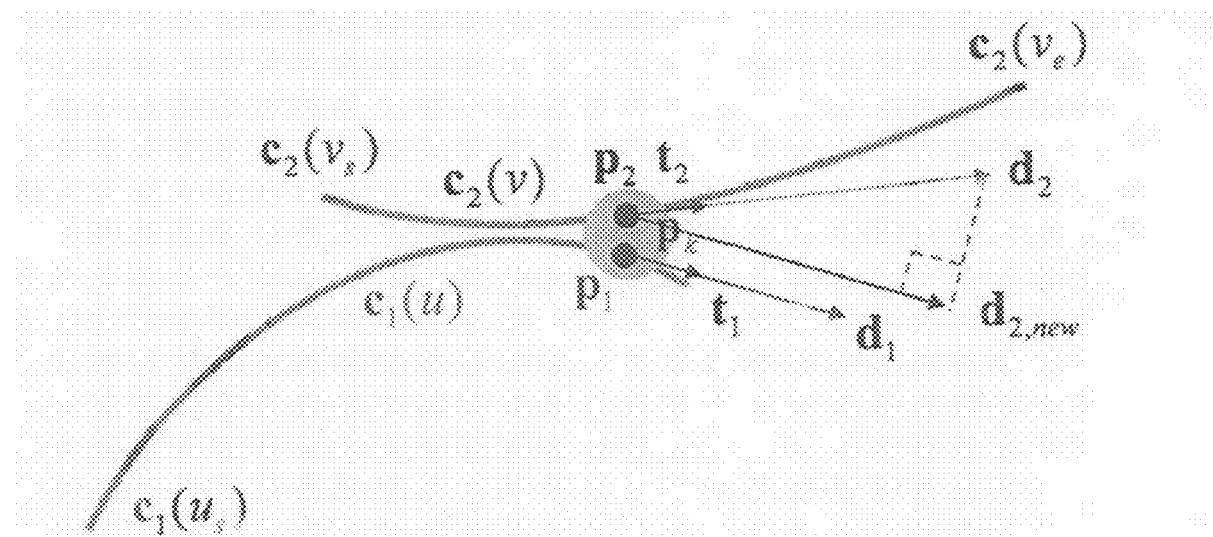
FIG. 29 shows tangential curve concatenation.

With reference to FIG. 29, an illustrative algorithm for tangential curve concatenation is described where the later created curve moves to the earlier created curve. Let two curves $c_1(u)$ and $c_1(v)$ be near tangent under the dot gesture. $p_1=c_1(u_k)$ and $p_2=c_2(v_k)$ are the closest points from $p_k$, the center position of the dot gesture. The first derivatives calculated on the points are $d_1=c_1'(u_k)$, $d_2=c_2'(v_k)$, respectively. The tangent vectors are $t_1=d_1/\|d_1\|$, $t_2=d_2/\|d_2\|$, respectively. Assume that $c_1(u)$ was created earlier than $c_2(v)$. $c_2(v)$ is first modified so that $c_2(v_k)=p_1$, $c_2'(v_k)=d_{2,new}=(d_2 \cdot t_1)t_1$ by using the known constraint-based curve manipulation algorithm (Fowler, B. and Bartels, R., 1993, "Constraint-Based Curve Manipulation," IEEE *Computer Graphics and Applications* 13, 5, 43-49), which is incorporated by reference herein in its entirety). Then, the two curves $c_1(u)$ and $c_2(v)$ are clipped so that they are defined on $[u_e, u_k]$ and $[v_k, v_e]$, respectively. The dot vector of $c_2(v)$ is scaled to $[v_{s,new}, v_{e,new}]=[u_k, v_{e,new}]$ so that $c_2'(v_k)=d_1$. A new $c_3(t)$ is then created on $[t_s, t_e]=[u_s, v_{e,new}]$ by simply connecting $c_1(u)$ and $c_2(v)$.

FIGS. 13A-13H shows the use of dot gesture 1100 for tangential concatenation of two curves 1300, 1302 to generate a smooth corner between them. Starting at FIG. 13A, curves 1300, 1302 have been sketched by the user, such as using the curve settling technique described above. As shown in FIG. 13B, the user next sketches one or more curves 1304 between curves 1300, 1302 and applies check gesture 800 to settle curve(s) 1304 as shown in FIG. 13C. This results in the three curves 1300, 1302, 1308 shown in FIG. 13D. As shown in FIG. 13E, the user then applies dot gesture 1100 where curves 1300, 1308 overlap, resulting in the tangential concatenation of curve 1300 with curve 1306, as shown in FIG. 13F, the tangential concatenation shown as curve 1308. As shown in FIG. 13G, the user applies dot gesture 1100 where curves 1302, 1308 overlap, resulting in the tangential concatenation of curve 1302 and curve 1308. This results in curves 1300, 1302 being joined with a smooth corner into a single curve 1310 as shown in FIG. 13H.

FIGS. 14A-14E show the use of dot gesture 1100 for end-point snapping between two curves 1400, 1402. Where an end of curve 1400, extends beyond where curve 1400 intersects curve 1402, as shown in FIG. 14A, the user applies dot gesture 1100 in proximity to the intersection of curves 1400, 1402, as shown in FIG. 148, resulting in the excess portion of curve 1400 extending beyond where curve 1400 intersects curve 1402 being trimmed off. In an aspect, the dot gesture fully covers the excess portion of the curve 1400 being trimmed. Similarly, where an end of curve 1400 stops short of intersecting curve 1402, as shown in FIG. 14E, the user applies dot gesture 1100 in proximity to where curves 1400, 1402 should intersect, as shown in FIG. 14D, resulting in the gap between curves 1400, 1402 being closed by the end of curve 1400 being extended to intersect curve 1402. In an aspect, the dot gesture fully covers the gap being closed. FIG. 14C shows the result of the end-point snapping in either case where curve 1400 ends where if intersects curve 1402.

FIGS. 15A-15C shows similar end-point snapping for multiple curves 1500, 1502, 1504 using dot gesture 1100.

FIGS. 10A-16E shows angular concatenation of two curves 1800, 1802 using dot gesture 1100 resulting in a single angular curve 1604 (FIG. 16C).

FIGS. 17A-17D illustrates the use of dot gesture 1100 for exclusive erase of a set of curves 1702 making up a shape 1700. if a user desires to edit curve 1700 by deleting portions of curves 1702, such as to create composite curve 1704 (FIG. 17D), the user can do so by applying partial curve scratch-out gesture 908, as described above, to each portion of each curve 1702 that the user desires to delete, as shown in FIG. 178. Alternatively, in an aspect, dot gesture 1100 can be used for exclusive erase of shape 1700, such as to create composite curve 1704 as shown in FIG. 17D. As shown in FIG. 17C, the user applies dot gesture 1100 to a starting point on a curve(s) of shape 1700 and in a continuous pen movement without lifting pen 114 after applying the dot gesture 1100 traces with pen 114 the portion of shape 1700 that the user desires to retain. Upon completion of the tracing, such as when pen 114 reaches the point where the dot gesture 1100 was applied, or pen 114 is lifted from sketch tablet 118, the curve model generation software deletes all of shape 1700 except the portion that was traced. As used herein, "exclusive erase" means that the portion of a shape (made up of a set of multiple curves) that was traced is retained and all other portions of the shape are deleted.

In an aspect, gesture based canvas and camera control, also referred to herein as navigation, is provided. As used herein, "navigation quasi-mode" means that the selected navigation is active while a key on the keyboard or button on the pen is held down by the user, but drawing mode is reverted to when the key or button is released by the user. As commonly understood, canvas control means rotating/panning or zooming (in or out) the image, but keeping the perspective from which the viewer views with the same view frustum, and camera control means changing the perspective from which the viewer views, that is, changing the view frustum. In an aspect, canvas control quasi-mode is selected prior to applying pen gestures, such as by holding down a key (e.g., the "shift" key) on keyboard 110, or holding down a button on pen 114. While holding down the key or button, the user applies a circular pen motion gesture 1801 to select rotation quasi-mode and a linear pen motion gesture 1803 to select zoom/pan/control rectangle quasi-mode. Once rotation quasi-mode is on, the user can continuously control rotation of the image clockwise or counterclockwise with movement of the pen 114. Similarly, once zoom/pan/control rectangle mode is on, the user can create a control rectangle, zoom the image in and out, and pan or drag image with movement of the pen 114.

To create a control rectangle, sometimes referred to as a "zoom box," the user applies the appropriate pen motion gesture to the desired portion of the image. In the illustrative example of FIG. 18, the user applies a diagonal pen motion gesture 1803 to create control rectangle 1802. Once control rectangle 1802 is created, the user can apply appropriate gestures to quick zoom in, quick zoom out, rewind for zoom-all, or pan or paper drag. In the illustrative example of FIG. 18, the user applies an outward flick gesture 1806 to a control rectangle 1802 to quickly zoom-in the image, and an inward flick gesture 1808 to control rectangle 1802 to quickly zoom-out the image. In the illustrative example of FIG. 18, the user applies a linear pen motion gesture 1810 starting at generally the center of control rectangle 1802 to pan or drag the image in the direction of the pen gesture. In the illustrative example of FIG. 18, the user applies a counter-clockwise circular pen motion gesture (or rewind gesture) 1812 around control rectangle 1802 to zoom-all. That is, to quickly un-zoom the image and return it to its original size prior to any zooming. It should be understood that the particular pen gestures are illustrative, and other pen gestures can be utilized to provide the above discussed canvas control. For example, a counter-clockwise spiral pen motion gesture may be used as an "undo" command.

Figure 18:
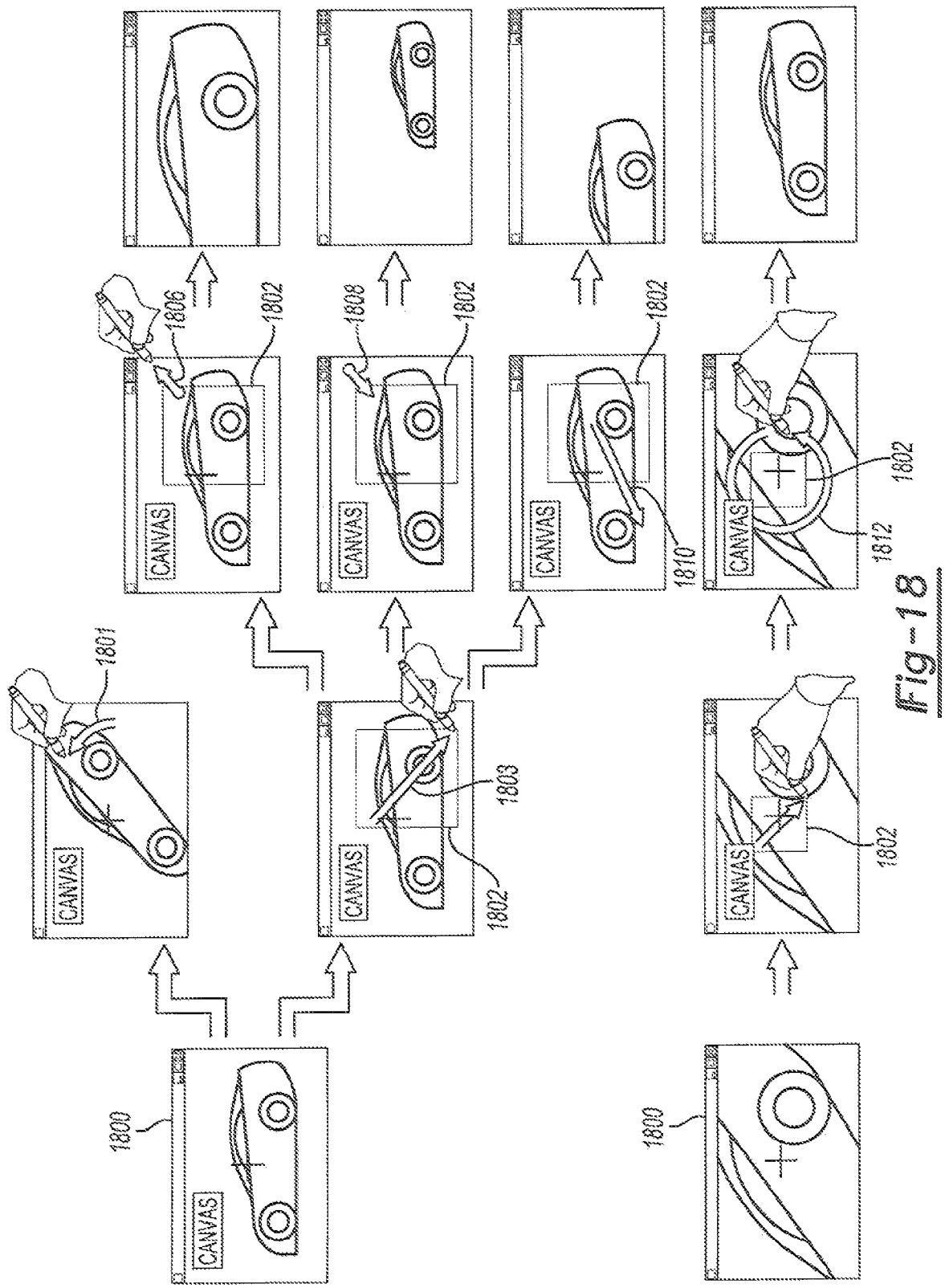
FIG. 18 show an aspect whereby canvas control is achieved through a plurality of pen gestures.
Figure 19:
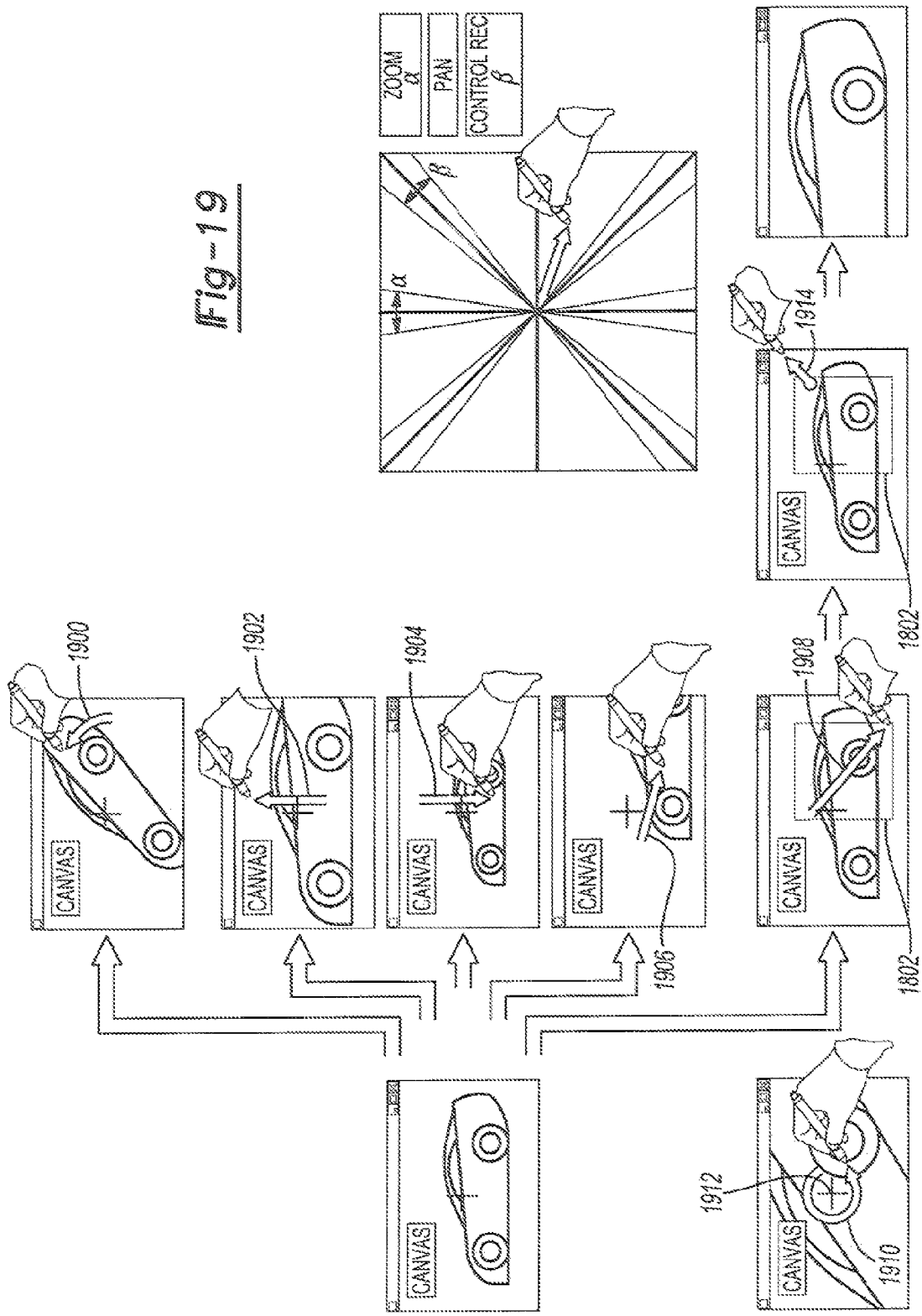
FIG. 19 show an aspect whereby canvas control is achieved through a plurality of pen motion gestures.

FIG. 19 shows a variation of the gesture canvas control of FIG. 18. in the variation of FIG. 19, the curve model generation software recognizes a circular pen gesture as rotation quasi-mode and a directional linear pen motion gesture as continuous zoom/pan/control rectangle quasi-mode. This eliminates the intermediate step creating a control rectangle for continuous zoom and pan. A circular pen gesture 1900 both selects continuous rotation quasi-mode and rotates the image clockwise or counterclockwise in the direction of the pen gesture. Rotation quasi-mode remains in effect until the pen 114 is lifted or the user releases the key on the keyboard or the button on the pen 114, which results in a return to the drawing mode.

In the illustrative embodiment of FIG. 19, a linear vertical up pen motion gesture 1902 or down motion gesture 1904 starts continuous zoom. Once continuous zoom is on, the user can zoom in and out the image continuously with appropriate movement of pen 114. The user applies a non-vertical linear pen motion gesture 1906 for pan, a forty-five, degree diagonal pen motion gesture 1908 to create control rectangle 1802, a circular pen gesture (or rewind gesture) 1910 around a center mark 1912 of the image to zoom-all, and a outwardly directed flick gesture 1914 to control rectangle 1802 for quick-zoom in. Quick-zoom in allows the user to directly define the image region to be enlarged and shows the resulting image immediately.

Figure 20:
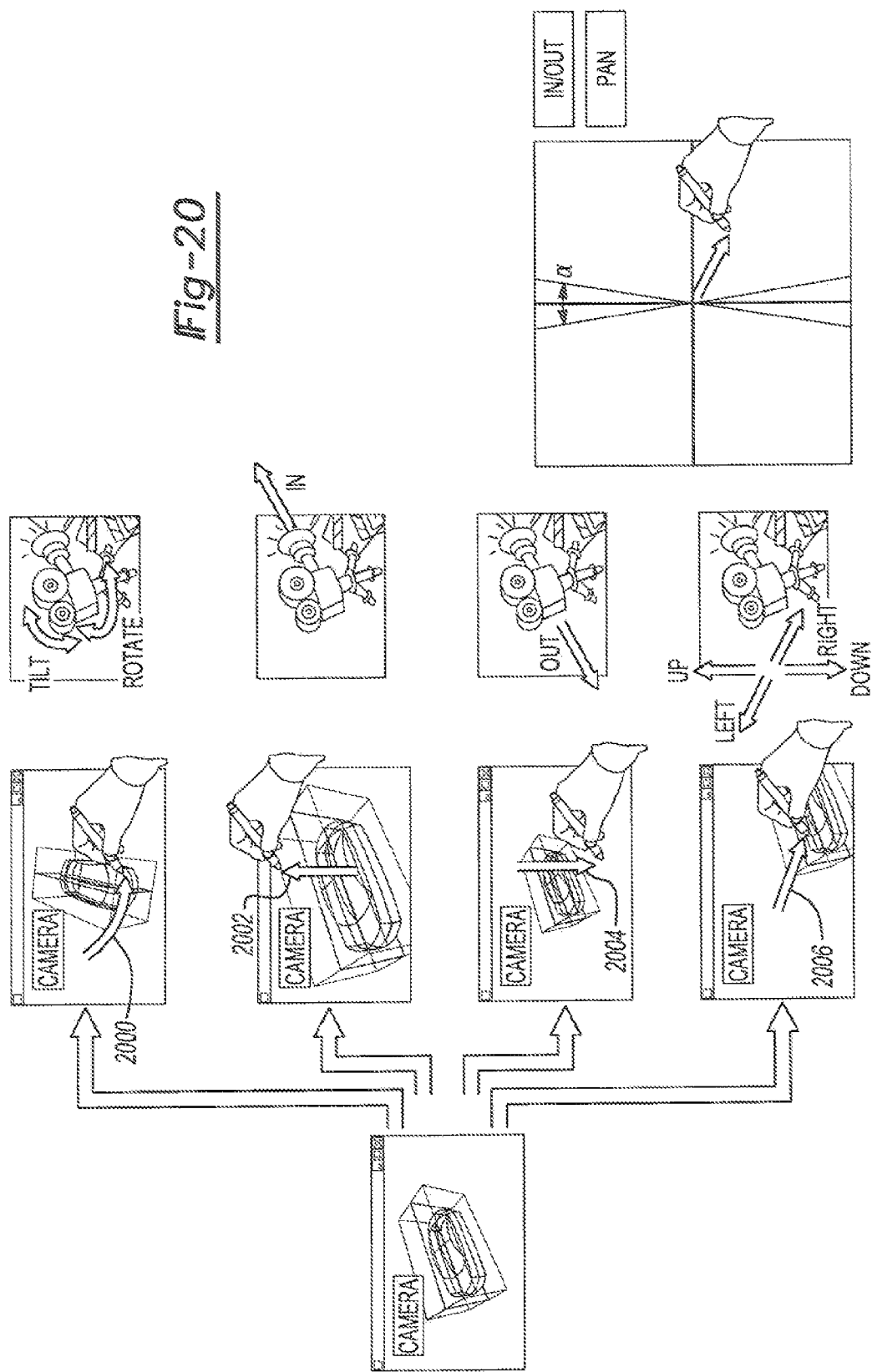
FIG. 20 show an aspect whereby camera control is achieved through a plurality of pen motion gestures.

With reference to FIG. 20, gesture based camera control is described. Camera control quasi-mode is selected prior to the user applying pen gestures, such by the user holding down a modifier key on keyboard 110, such as the "control" key, or holding down a button on pen 114. While holding down the key or button, the user applies the appropriate pen motion gesture to select the desired camera control quasi-mode. Camera rotation quasi-mode is activated by a circular pen motion gesture 2000. Once camera rotation quasi-mode is on, the user can continuously orbit the camera by appropriate movement of pen 114. Camera-in/out mode is activated by a vertical linear pen motion gesture either up (pen motion gesture 2002) or down (pen motion gesture 2004), Once camera-in/out mode is on, the user can move the camera in or out continuously by appropriate movement of pen 114. In an aspect, moving pen 114 vertically up moves the camera in and moving pen 114 vertically down moves the camera out. Camera pan mode is activated by a non-vertical linear pen motion gesture 2008. Once camera pan mode is on, the user can continuously pan the camera up, down, left and right by appropriate movement of pen 114. in an aspect, camera in/out mode and camera pan mode are both activated by a linear pen motion gesture, with the camera movement depending on whether pen motion gesture is vertical (camera in/out) or non-vertical (camera pan).

Because the user defines the shape of a vector curve not by dragging its control points but by sketching it, how easily the user can find viewing conditions (Including 2D) affects not only work efficiency but also curve quality. Thus, it is important to provide the user with intuitive and easy-to-use navigation techniques driven by a pen, such as pen 114. In general, the total number of parameters related to viewing is 11 (6 for camera position and rotation, 5 for projection) (Michener, J. C., and Carlbom, I. B., 1980, Natural and Efficient Viewing Parameters In Computer Graphics," *Proceedings of ACM SIGGRAPH* 80, 14, 3, 238-245). Existing 3D modeling software lets the user control them with multi-button mouse and hotkey combinations. One prior art approach devised a special widget for viewing control. (Singh, K., Grimm, C., and Sudarsanam, N., "The IBar: A Perspective-Based Camera Widget," *Proceedings of UIST* 2004, ACM Press, 95-98. Singh et al.) It helps the user change perspective distortion of a 3D scene by directly modifying the angle of the receding lines in two-point perspective, in an aspect of the present disclosure, a natural viewing control interface for pen input is provided, which uses pen motion gestures in quasi-modes invoked with pen barrel buttons. It does not use complicated hotkey combinations or require knowledge of complicated viewing or camera parameters.

Figure 32:
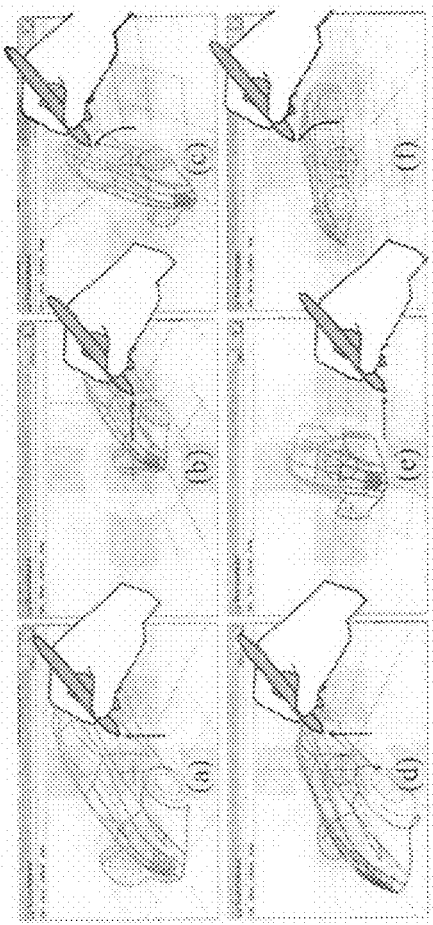
FIGS. 32(a)-(f) show an aspect of a pen-based drawing system having unified canvas/camera navigation.

With reference to FIGS. 32(*a*)-(*c*) the quasi-mode for canvas control remains in effect as long as the user holds down, for example, a lower pen barrel button (not shown) on pen 114. During the canvas control quasi-mode, a the cross hair is displayed to indicate the zoom center and canvas rotation pivot point.

The vertical linear pen motion gesture invokes the canvas zoom function (FIG. 32(*a*)). If the gesture is recognized, the user can continue to move the pen for enlarging or reducing the size of the canvas with respect to the zoom center. The curve model generation software considers only the vertical component of the pen motion (upward for zoom in, downward for zoom out). The horizontal linear motion pen gesture is used for turning on the canvas pan function (FIG. 32(*h*)). Then, the canvas sticks on the tip of pen 114, and moves following the user's pen stroke. The circular motion pen gesture activates canvas rotation (FIG. 32(*c*)). Once recognized, the user can rotate the virtual canvas around the cross hair in a manner similar to rotating physical paper pinned at the center position.

The operations performed in the canvas control quasi-mode do not cause perspective change in the displayed image. They bring results similar to moving and rotating paper on the table, or enlarging or reducing the image size on paper using a copy machine. On the other hand, the operations defined in the camera control quasi-mode, Illustratively activated when the user holds down, for example, an upper pen barrel button (not shown) of pen 114 change the perspective and/or viewing direction-that is, if changes what is often referred to as the view frustum. They are based on the object-centric paradigm (Barrileaux, J., 2001, "3D User interfaces with Java 3D," Manning) where the camera is centered on an object and the viewpoint is rotated relative to the object. In accordance with an aspect of the present disclosure, the camera control gestures are interactional consistent with the canvas control gestures. The vertical linear motion pen gesture is used for camera perspective distortion (FIG. 32(*d*)), the horizontal linear motion pen gesture for camera pan (FIG. 32(*e*)), and the circular motion gesture for camera orbit (FIG. 32(*f*)).

Figure 33:
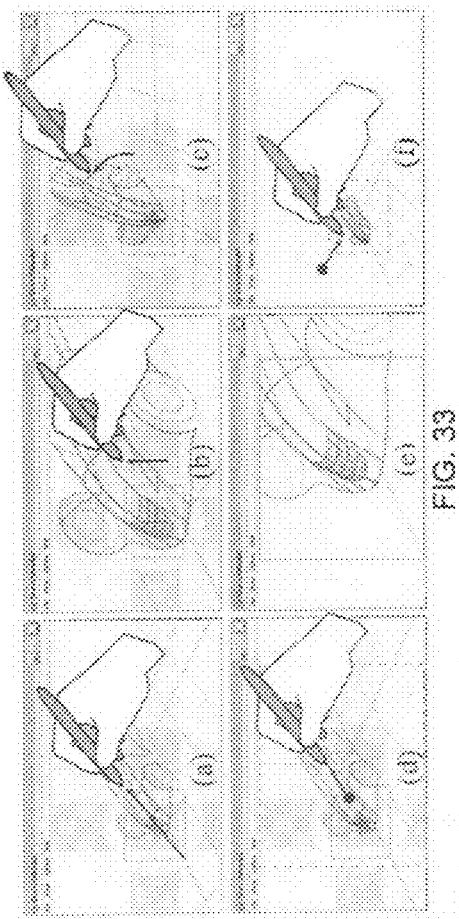
FIGS. 33(a)-(f) show pen gestures for canvas control in accordance to an aspect.

Returning to canvas control and referring to FIGS. 33(*a*)-(*f*), if the diagonal linear motion pen gesture is recognized, the user can define a zoom box from the start position of the stroke to the current tip position (FIG. 33(*a*)). When the user lifts pen 114 slightly, the zoom box area is determined and lasts while the pen 114 is hovering. The center of the zoom box becomes a new zoom center or canvas rotation pivot (FIGS. 33(*b*) and (*c*)). The flick gesture starting inside the zoom box and ending outside invokes quick zoom in which enlarges the canvas area specified with the zoom box to the whole screen (FIGS. 33(*d*) and (*e*)). Quick zoom in improves work flow and keeps the user's focus on work at hand by magnifying a local area of interest without having to apply several zoom and pan operations. Similarly, the flick gesture from outside to inside the zoom box invokes quick zoom out which zooms out the canvas quickly so that the contents on the whole screen shrinks to fit in the zoom box.

Some designers use the graphics tablet rotated to some degree, and may have difficulty applying vertical, horizontal, and diagonal linear motions. In an aspect of the present disclosure, transparent vertical and horizontal linear strips and a circular strip around the cross hair are displayed to orient the user lead them to apply correct motion gestures (FIGS. 32(*a*)-(*f*) and 33(*a*)-(*f*)).

On-screen menus help the user to focus on the current task and enhance work flow by avoiding frequent round-trips between application data and GUIs. (Kurtenbach, G. and Buxton, W., 1993, "The Limits of Expert Performance Using Hierarchic Marking Menus;" *Proceedings of CHI* 1993, ACM Press, 482-487; Igarashi, T., Matsuoka, S., and Tanaka, R., 1999, "Teddy: A Sketching Interface for 3D Freeform Design," *Proceedings of ACM SIGGRAPH* 99, ACM Press, 409-418 (1999); Guimbretière, F. and Winograd, T., 2000, "FlowMenu: Combining Command, Text, and Data Entry," *Proceedings of UIST* 2000, ACM Press, 213-218 (2000); Fitzmaurice, G., Khan, A., Pieké, R., Buxton, B., and Kurtenbach, G., 2003, "Tracking Menus," *Proceedings of UIST* 2003, ACM Press, 71-79) in an aspect, an on-screen menu, called a check menu, is provided to execute commands which are used with moderate frequency in 2D/3D sketching. The check menu does not need the help of the non-preferred hand nor special buttons. It appears immediately where the user applies the check gesture, and allows the user to execute a command comfortably.

Figure 34:
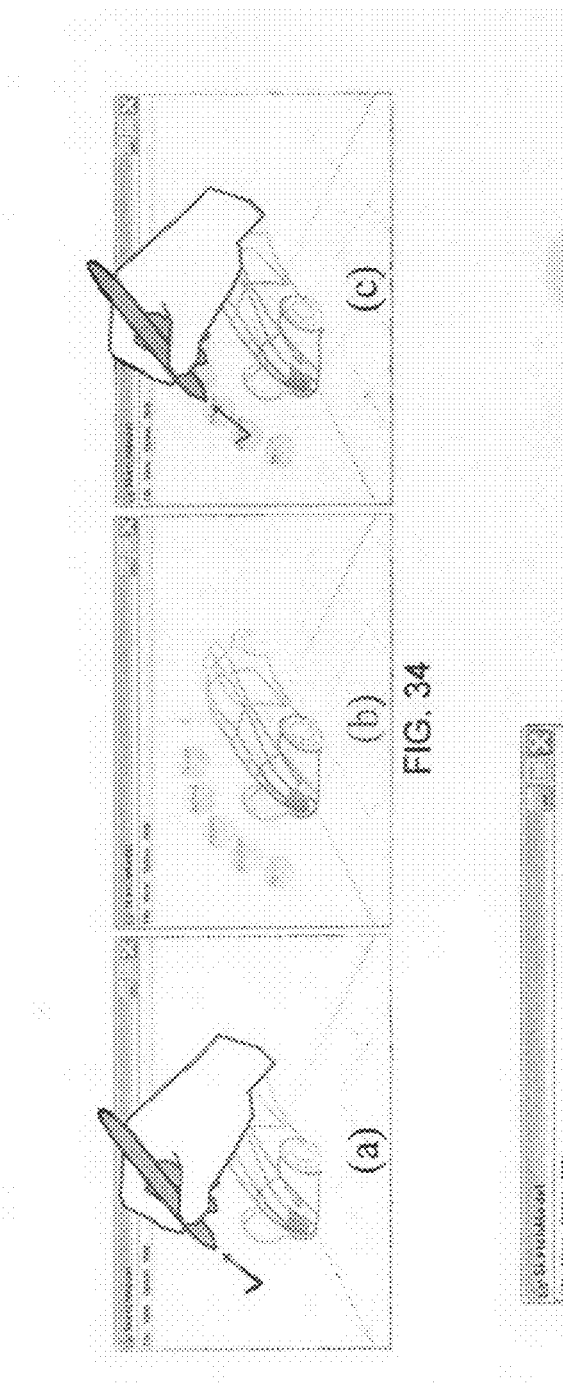
FIGS. 34(a)-(c) show a check menu in accordance with an aspect.

At any moment when there are no intermediate stroke curves to settle, the user can invoke the check menu by applying the check gesture (FIGS. 34(*a*) and (*b*)). Then the user selects an item on the check menu by applying the check gesture (i.e. check to bring up the check menu, check to make a choice) (FIG. 34(*c*)).

The shape and location of the check menu consider the ergonomics of the user's wrist motion. The items of the check menu are arranged in an arc so that the user can reach each item with little movement. In an aspect, a different setting of the check menu is given to each user based on the handedness and the individual range in which the tip of pen 114 moves comfortably with the wrist anchored. The check menu appears near the invoking check gesture so that the middle choice is located where the check stroke ends. When selecting a menu item, the choice closest to the cusp of the check is executed.

In an aspect, the check menu is used in hierarchical menu structures and natural selection-action phrases. Hierarchical menu structures are described in Kurtenbach, G. and Buxton, W., 1993, "The Limits of Expert Performance Using Hierarchic Marking Menus," *Proceedings of CHI* 1993, ACM Press, 482-487; and natural selection-action phrases are described in Buxton, W., 1886, "Chunking and Phrasing and the Design of Human-Computer Dialogues," *Proceedings of IFIP World Computer Congress on information Processing*, North-Holland, 475-480.

In an aspect, the curve modeling generation software provides an integrated interface for creating 3D concept models. Various 3D curve sketch scenarios described below can be utilized with the basic interaction aspect described above.

Figure 35:
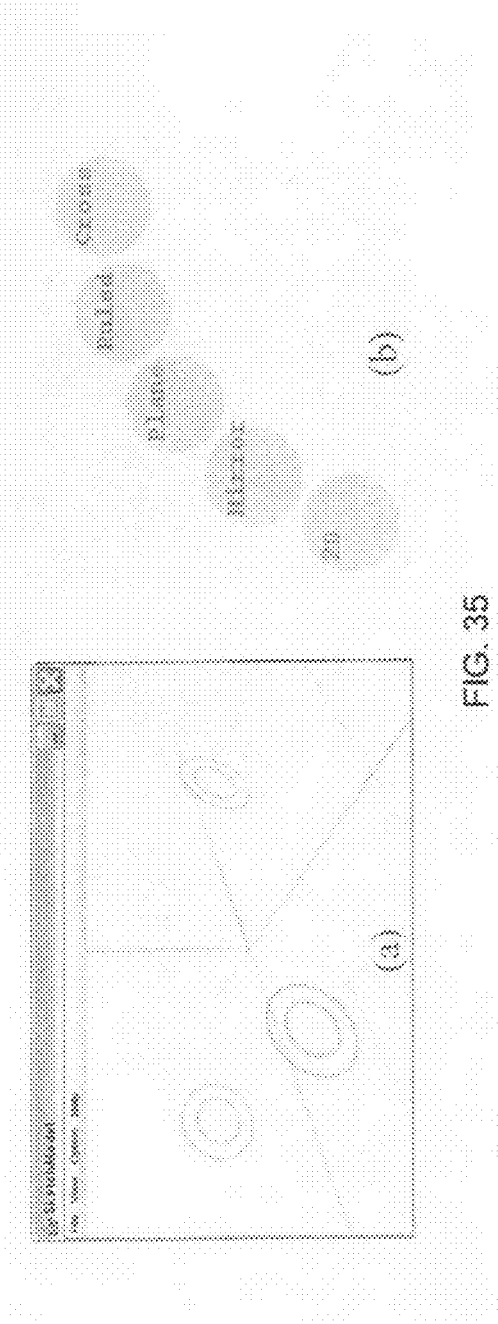
FIG. 35(a) shows a 3D canvas in accordance with an aspect.
FIG. 35(b) shows a check menu for 3D in accordance with an aspect.
Figure 36:
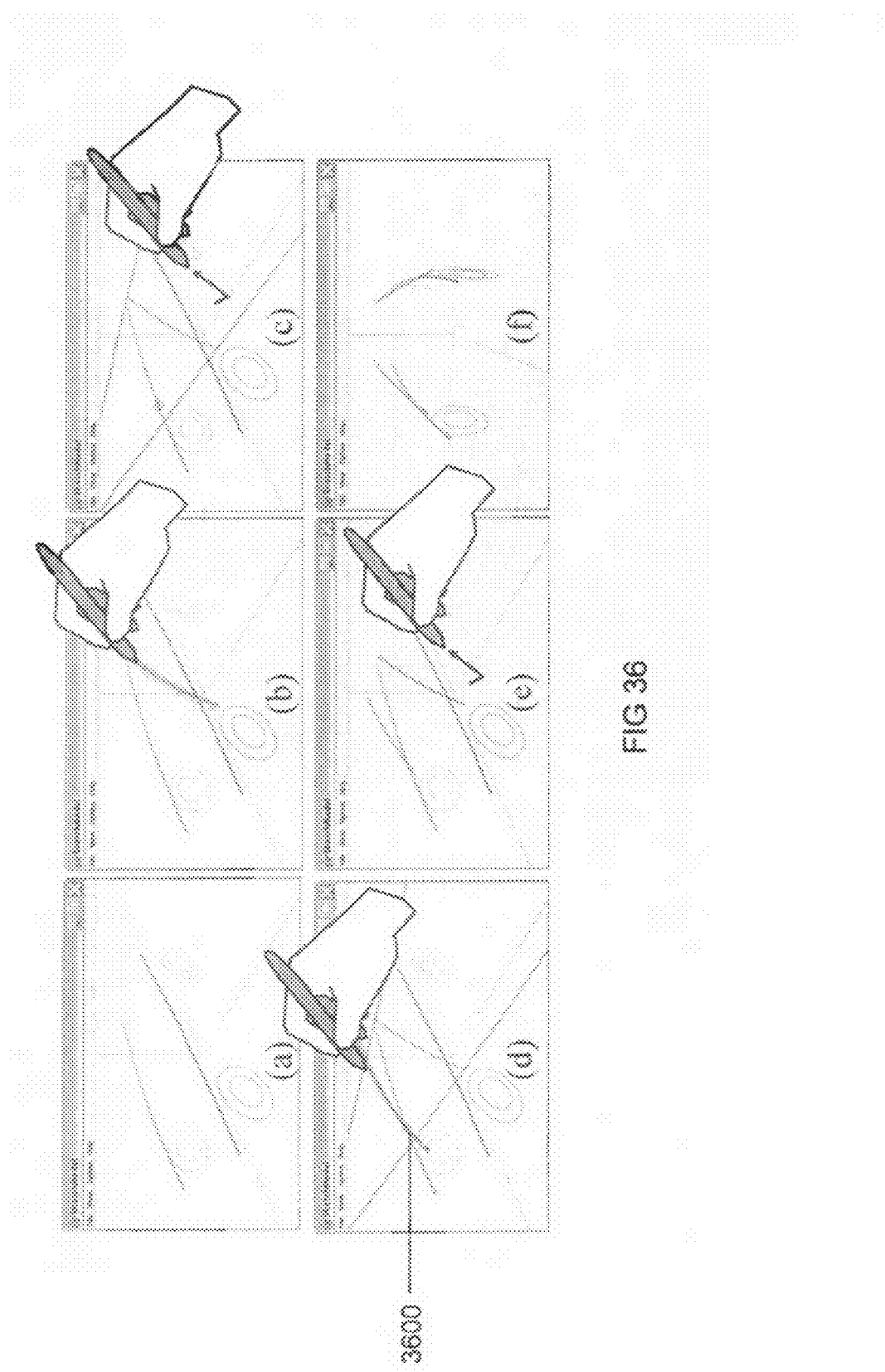
FIGS. 36(a)-(f) show a successive mirror-symmetric 3D curve sketch with a perspective drawing hint in accordance with an aspect.

With reference to FIG. 35(a), a canvas of the pen based drawing system in accordance with an aspect is shown, it provides a static perspective frame for automotive designers, which includes orthographic axes (illustratively, x-axis in red, y-axis in green, and z-axis in blue), ground grid, wheels in default (engineering constraints are not depicted in this Figure.). Some useful perspective hints such as receding lines to the vanishing point, intersection points between a construction (sketch) surface and existing 3D curves, are provided dynamically as needed. Fog is applied to 3D rendering of the scene to provide a depth queue. (Elber, G., 1995 "Line IllustrationseComputer Graphics," *The Visual Computer* 11, 6, 290-298) This "atmospheric perspective" effect that displays background curves hazy effectively provides the user with depth information on 3D curves. Thus, the user can focus on foreground curves while not being distracted by background curves. The zx-plane is illustratively set as the center plane, and the curve model generation software provides for creation and manipulation of all curves reflected in the center plane.

FIG. 35(b) shows the check menu used for 3D curve sketching: 2D thumbnail sketch, mirror-symmetric 3D curve, 3D curve sketch on orthographic planes, 3D curve sketch on ruled surfaces, and cross curve sketch with geometric constraints, clockwise.

Referring generally to FIGS. 21-28, an exemplary embodiment of an aspect of a pen-based drawing system and method that allows users, such as artists, to create and manipulate 3D objects, in particular, non-planar 30 curves, is described. This system and method, illustratively implemented in curve model generation software run on a computer system 102, uses a novel method of creating the 3D curves based on the user's perspective drawing abilities. In an aspect, it uses a set of pen gestures, similar to those described above, for unified canvas/camera operations. In an aspect, it uses a set of pen gestures, similar to these described above, to edit the 3D curves. As a result, the artist can focus on the creative task at hand rather than the details of the underlying mathematics behind the curve creation and operating software being used.

In general, if is not possible to obtain a 3D curve from a single 2D curve sketch due to lack of depth information. One technique that has been used to create a 3D curve from a 2D curve is a technique known as "mirror symmetry." Bae, S. H.; Kijima, R.; and Kim, W. S.; 2003, "Digital Styling for Designers: 3D Plane-Symmetric Freeform Curve Creation Using Sketch Interface," *Lecture Notes in Computer Science*, Vol. 2669 (*Proceedings of ICCSA* 2003) (pp. 701-710) describes the basic concepts of the mirror-symmetric 3D curve creation method, and is incorporated by reference herein in its entirety. In an aspect, the principle of the symmetric 3D curve sketch is reinterpreted with epipolar geometry (Faugeras, O., and Luong, Q. T.; 2001, "The Geometry of Multiple Images," *The MIT Press*) to provide a new robust mirror symmetry algorithm (described below) based on the foregoing along with an easy-to-use interaction scenario, illustratively implemented in the curve model generation software.

Figure 21:
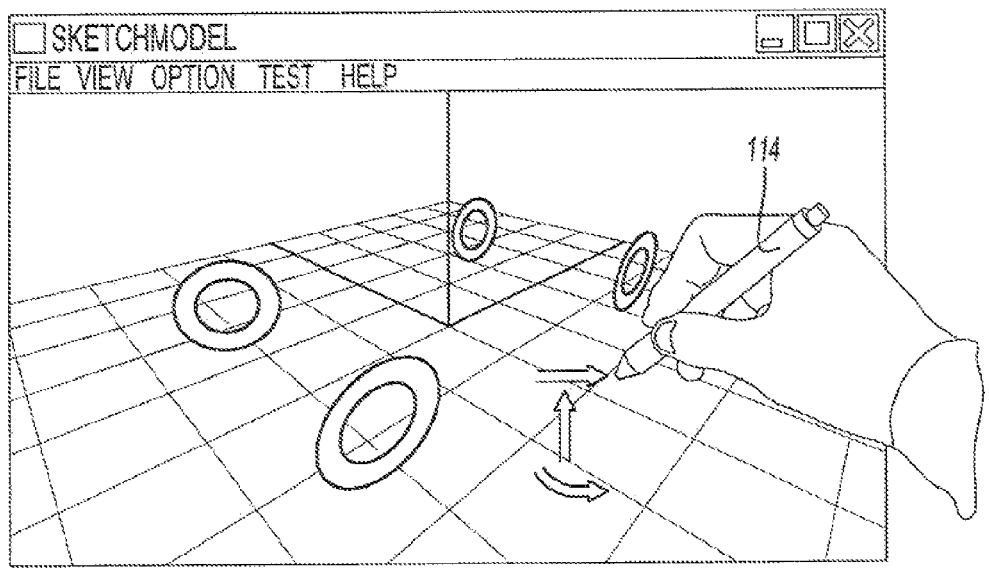
FIGS. 21-26 show an exemplary embodiment of an enhanced method of generating 3D curves from 2D curves for use in a pen-based drawing system.
Figure 22:
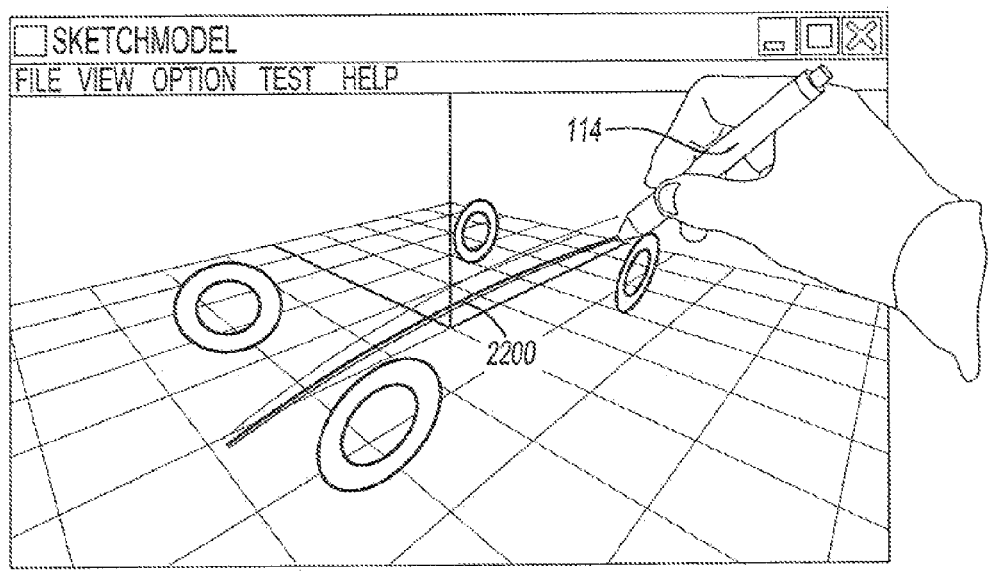
Figure 23:
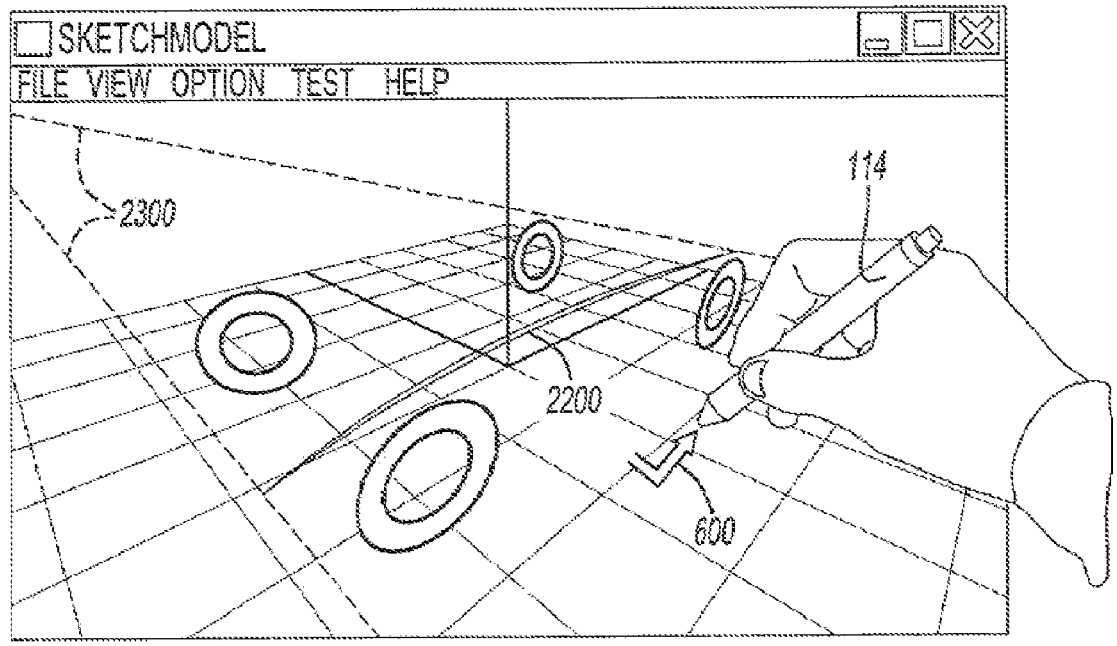
Figure 24:
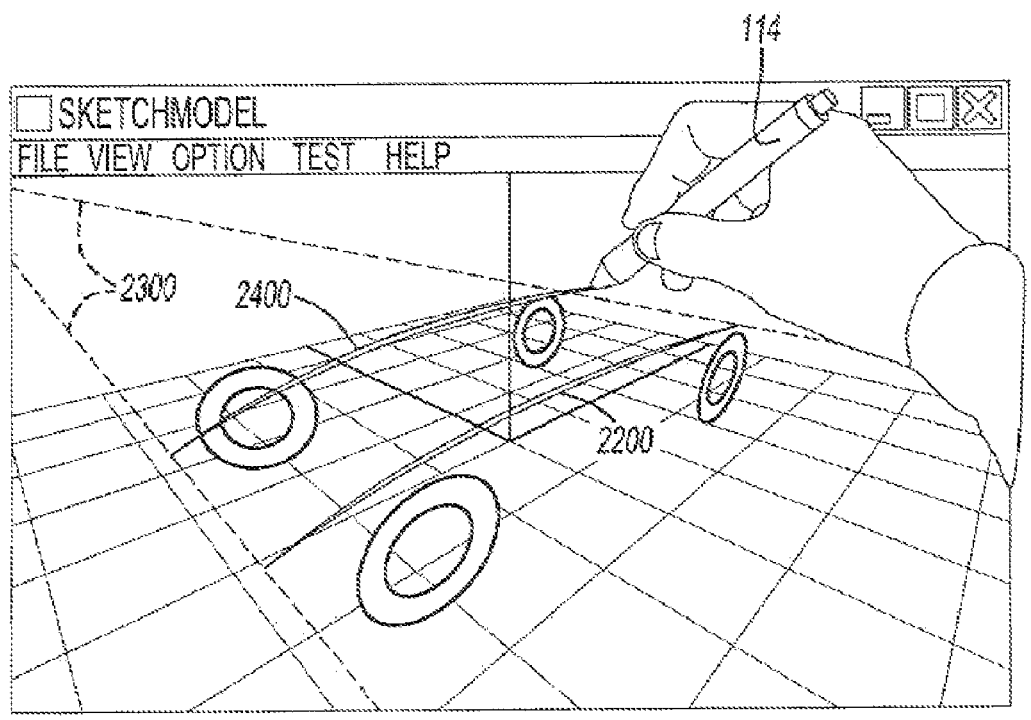
Figure 25:
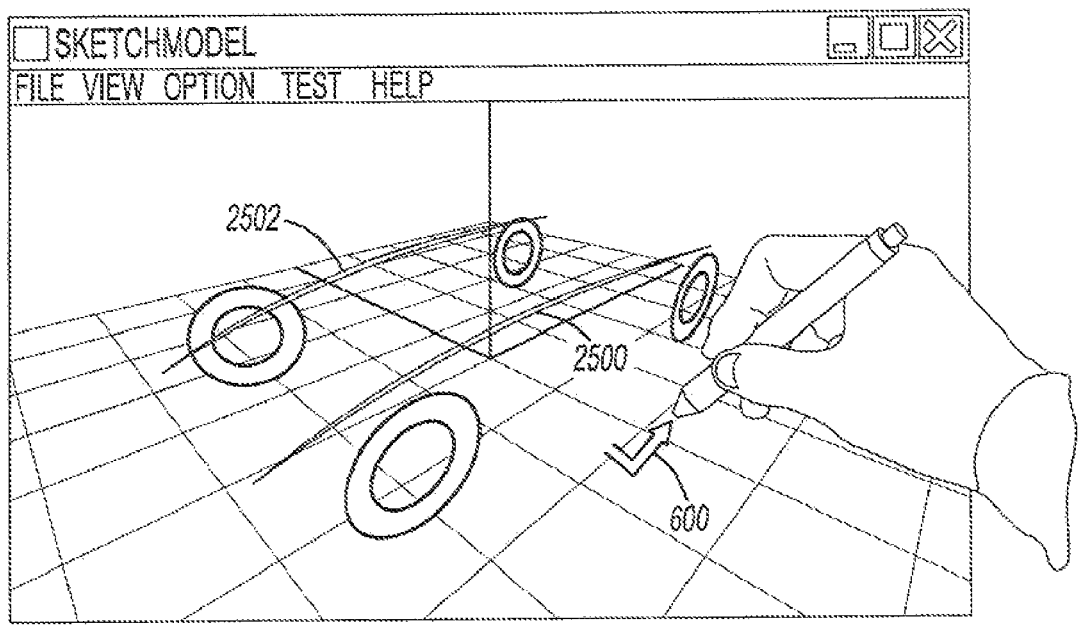

With reference to FIG. 21, a user first selects a viewing condition appropriate for perspective sketching by using gesture-based canvas/camera control, as described below. With reference to FIG. 22, the user next sketches a set of strokes to create a 2D curve 2200 using the multi-stroke vector curve creation described above. With reference to FIG. 23, the user then applies the check gesture 800 (again as described above) to settle the curves. The curve model generation software program then displays guidelines 2300 on screen 108 to help the user sketch a second curve. Guidelines 2300 may illustratively include two guidelines, one through each end point of the first sketched curve and the vanishing point to which the images of all the 3D lines parallel to the y-axis converge as shown in FIG. 23. With reference to FIG. 24, the user next sketches another set of strokes to create a second 2D curve 2400 using the multi-stroke vector curve creation described above. Applying the check gesture 800 (FIG. 25), the user then settles the second 2D curve 2400. The 3D aspect of the curve model generation software program then creates a pair of 3D curves 2500, 2502 from the two 2D curves, as shown in FIG. 25, that are mirror symmetric in 3D using the enhanced mirror symmetry algorithm described below. The user then checks and otherwise works with the 3D curves, using the gesture based canvas/camera control described herein.

The mirror-symmetric 3D curve sketch is a kind of view dependent sketch method. Therefore, if a first 2D curve is settled, the current perspective view freezes until a second 2D curve is determined and the resulting 3D curves are created (with canvas control (zoom, pan, rotate) still available).

Figure 26:
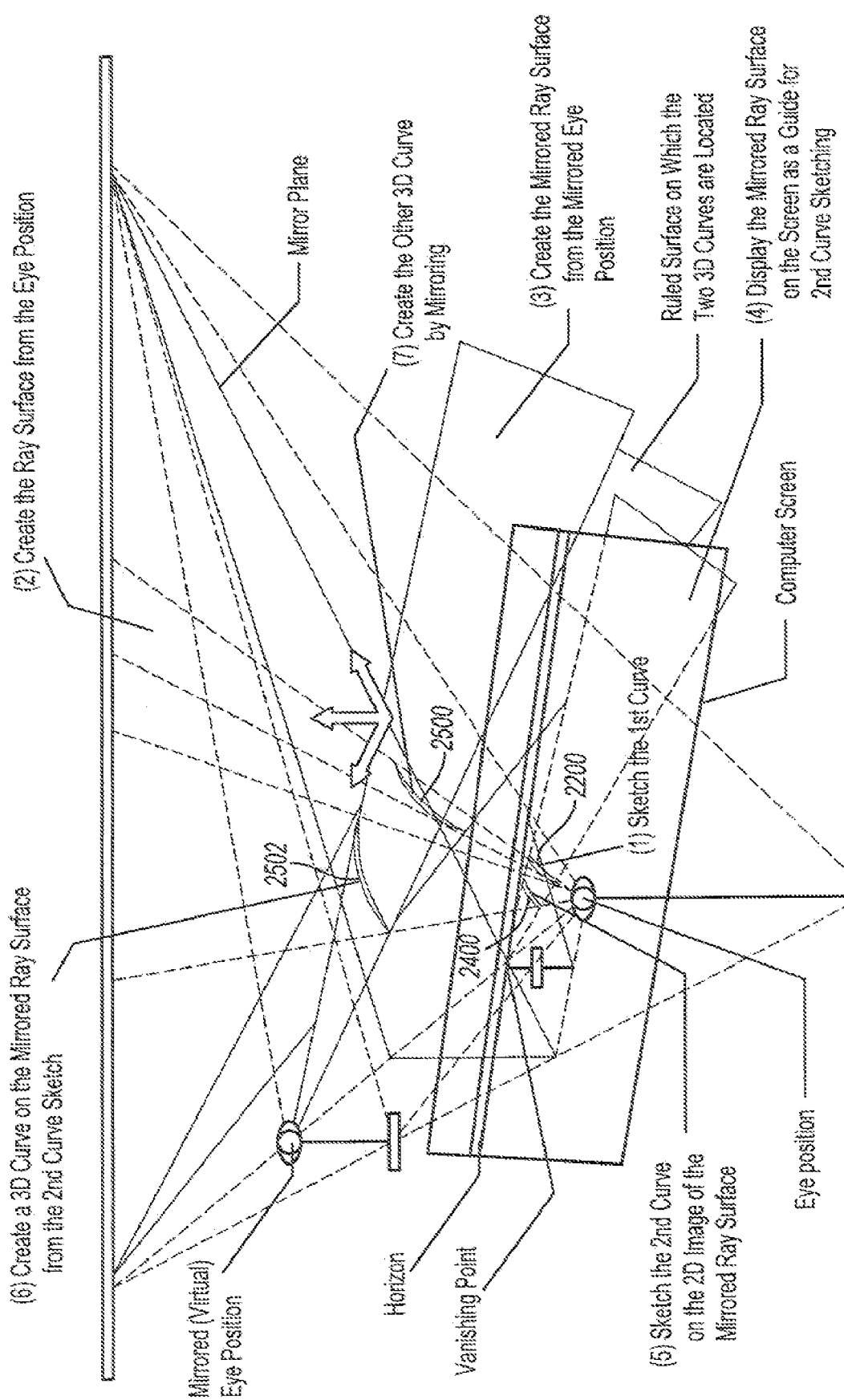

With reference to FIG. 26, the enhanced mirror symmetry algorithm is described. The steps numbered in ( ) below correspond to numbers in ( ) shown on FIG. 26.

The user sketches the first 2D curve 2200 as described above, (1) The program then calculates 3D curve on the computer monitor screen from the first 2D curve sketch 2200 under the current viewing condition.

(2) Next, the program creates the ray surface R starting from the eye position e and containing $c_1$.

(3) The program next creates the mirrored ray surface $R_M$ of R ($R_M$ starts from the mirrored eye position $e_M$).

(4) The program displays $R_M$ on the monitor screen, (The displayed $R_M$, which is the same screen image of the ruled surface on which two 3D curves to be created reside, converges to the vanishing point on the monitor screen and gives the user a guide for sketching the second 2D curve.)

The user then sketches the second 2D curve 2400 as described above on the screen image of $R_M$.

(5) The program calculates second 3D curve $c_2$ on the screen from the second 2D curve input on the screen image of $R_M$.

(6) The program next creates 3D curve $C_2$ (curve 2502) by projecting c onto $R_M$.

(7) The program then creates the other 3D curve d (curve 2500) by mirroring $C_2$.

Figure 30:
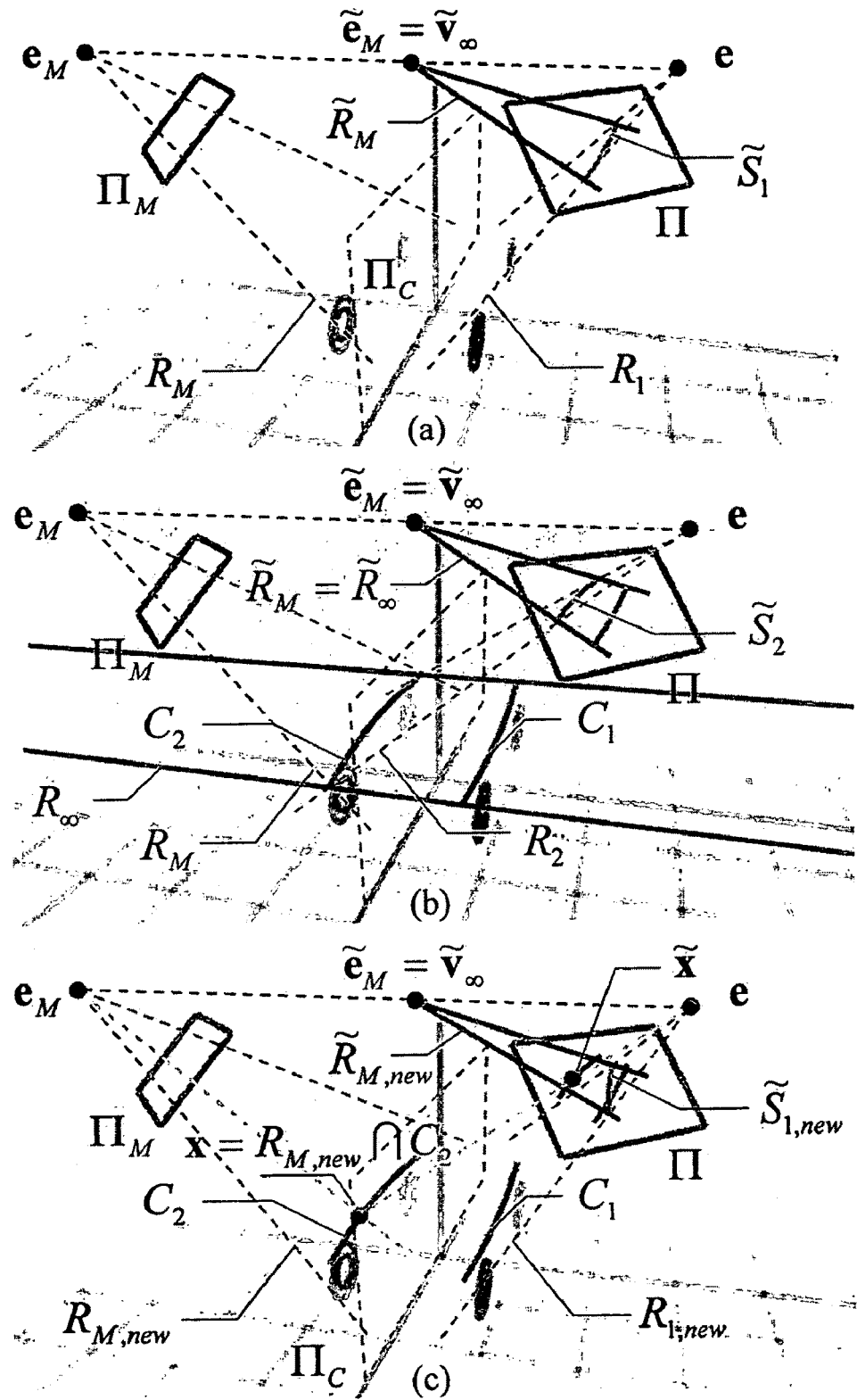
FIGS. 30(a)-(c) show an aspect of the 3D curve generation of FIGS. 21-26.

With reference to FIG. 30, if the user sketches a first curve (2D) $\tilde{S}_1$ on a picture plane Π from an eye position e, the curve model generation software defines a ray surface $R_1$ that contains the 3D trajectory of $\tilde{S}_1$ while starting from e (FIG. 30(a)) and its mirrored ray surface $R_M$ from the mirrored eye position $e_M$ that is symmetric with respect to the center plane $\Pi_C$. The 2D projection image $\tilde{R}_M$ on Π is a visual perspective hint given to the user because its boundary lines are the two receding lines to the vanishing point $\tilde{v}_\infty$ while going through the end points $\tilde{S}_1$. If the user sketches a second 2D curve $\tilde{S}_2$ on Π, the curve model generation software creates another ray surface $R_2$ that starts from e and going through the 3D position of $\tilde{S}_2$. Finally, a 3D curve $C_2$ is calculated by surface-surface intersection of $R_2$ and $R_M$ (FIG. 30(b)). $C_1$ is obtained by simply reflecting $C_2$ on $\Pi_C$. Noteworthy, $\tilde{R}_\infty$, the 2D projected image of the infinite ruled surface $R_\infty$ that contains $C_1$ and $C_2$, is always the same as $\tilde{R}_M$. Thus, by simply displaying $\tilde{R}_M$ on Π, the system gives the user a positive visual illusion of drawing a curve $\tilde{S}_2$ on $\tilde{R}_\infty$ that does not yet exist.

Figure 31:
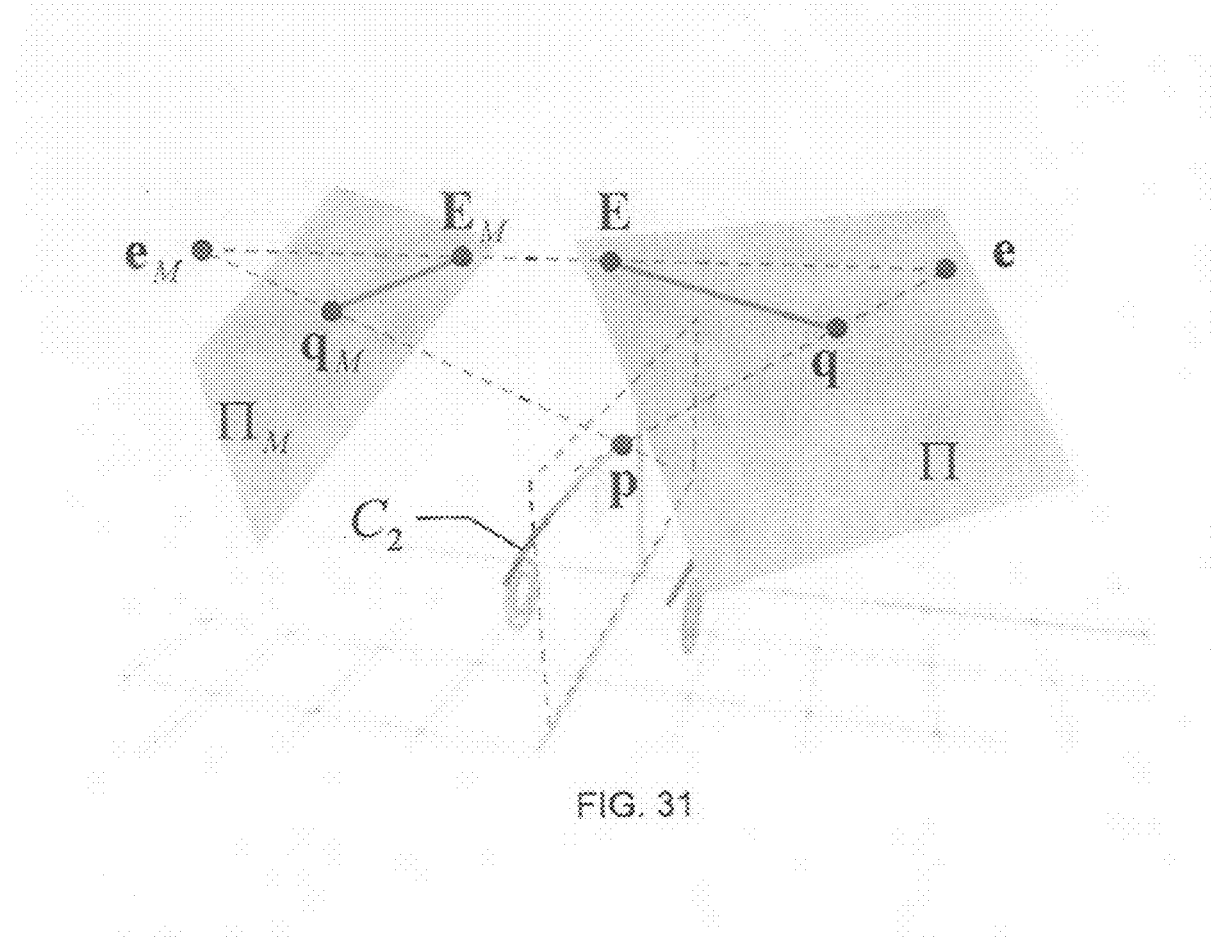
FIG. 31 shows an aspect of the mirror symmetric 3D curve generation of FIGS. 21-26.

This mirror symmetric 3D sketch algorithm can be thought of a special type of the epipolar method of multi-view sketch. (Karpenko, O., Hughes, J. F., and Raskar, R., 2004, "Epipolar Methods for Multi-View Sketching," *Proceedings of the 2004 EUROGRAPHICS Workshop on Sketch-Based Interfaces and Modeling*, pp. 187-173). With reference to FIG. 31, consider an arbitrary point p on $C_2$. An epipolar plane can be defined with (e, $e_M$, p), epipoles E and $E_M$ that are the vanishing points on O and UM, respectively, epipolar lines with (q, E) and ($q_M$, $E_M$). The process of calculation of p is: 1) the user specifies $q_M$ from $e_M$, 2) the curve model generation software shows the user the infinite epipolar line, which is the projection image of the infinite line that starts from $e_M$ and goes through $q_M$, 3) the user specifies a second point q on the epipolar line, and 4) the curve model generation software computer can find p. The present one-view sketch scenario—calculating $C_2$ by sketching $\tilde{S}_1$ and $\tilde{S}_2$ that are image curves of a mirror symmetric curve pair $C_1$ and $C_2$, yields the equivalent result to the two-view sketch scenario where the user sketches $\tilde{S}_2$ and $\tilde{S}_{2,M}$ of $C_2$ from e and its mirror-symmetric eye position $e_M$, respectively.

In every 3D curve sketch method based on epipolar geometry, the inference ambiguity and noise sensitivity increase as the two view vectors become parallel. Thus, in using the above discussed method, a user should avoid putting eye position near mirror plane or looking at the mirror plane perpendicularly to get good results.

Figure 38:
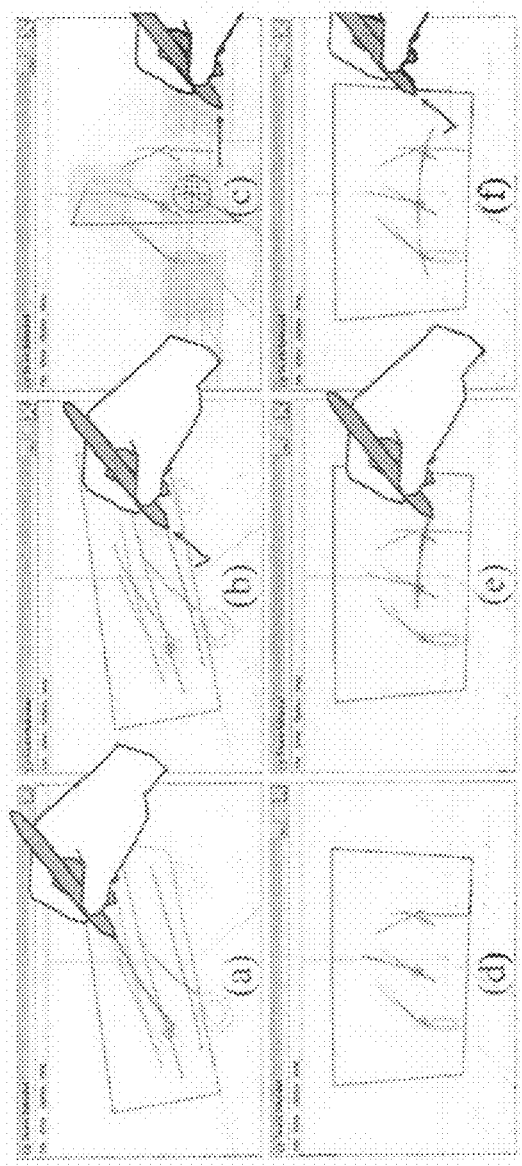
FIGS. 38(a)-(f) show the creation of 3D curves on orthographic sketch planes in accordance with an aspect.
Figure 39:
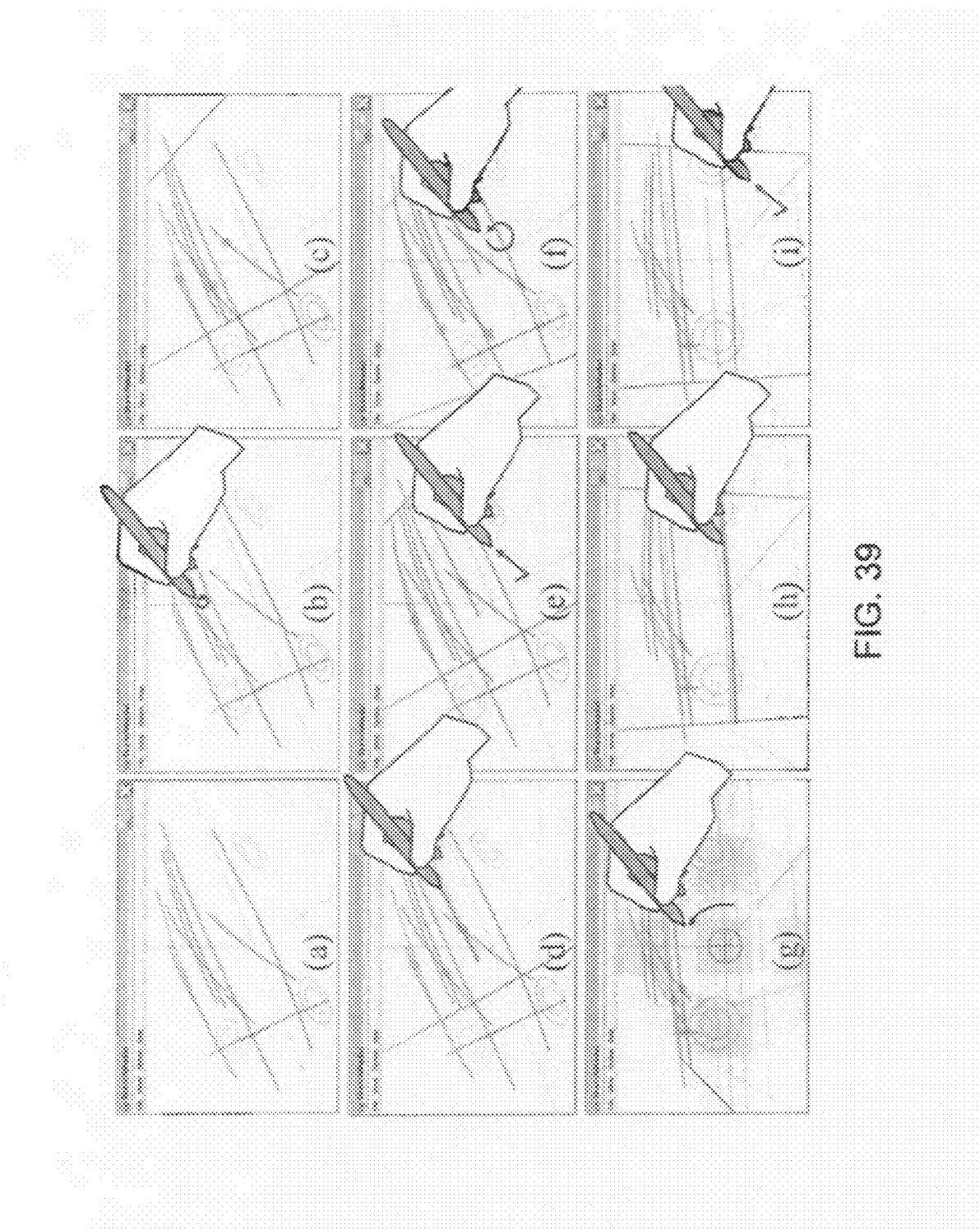
FIGS. 39(a)-(i) show the creation of 3D curves on orthographic ruled surfaces in accordance with an aspect.
Figure 40:
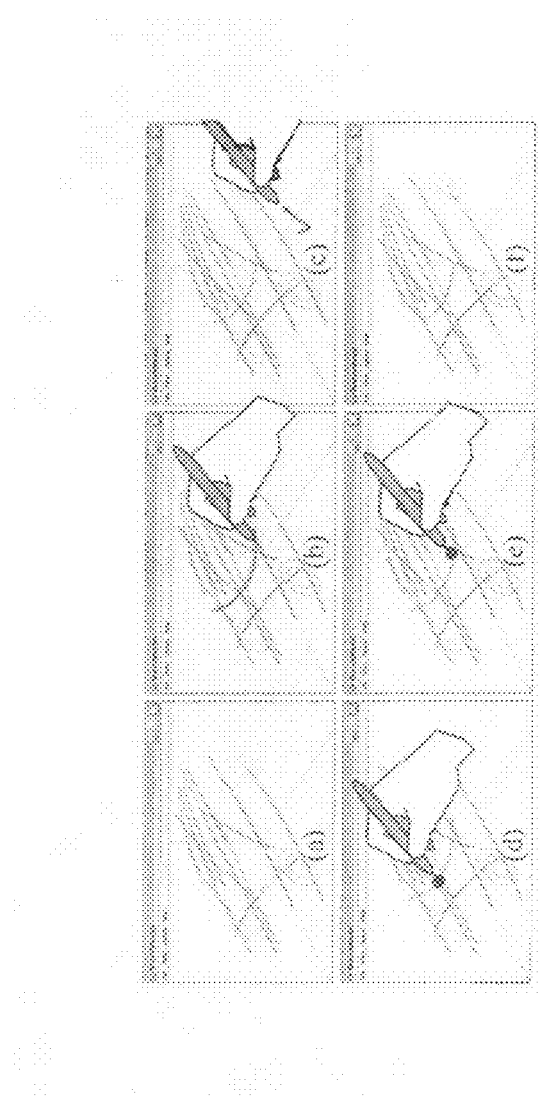
FIGS. 40(a)-(f) show the creation of smooth symmetric curves crossing a center plane by specifying geometric constrains in accordance with an aspect.

It is important that designers or users of drawing or sketching systems be able to use their perspective drawing skill. (Taylor, T., and Hallett, L., 1996, "How to Draw Cars Like a Pro," *Motorbooks International*; Robertson, S., *With The Hot Wheels™ Designers*, 2004, "How to Draw Cars the Hot Wheels™ Way", MBI; Chelsea, D., 1997, "Perspective! For Comic Book Artist," Watson-Guptill). In an aspect, the 3D sketching technique provided by the curve model generation software allows designers, such as automotive designers, not only to utilize their perspective drawing skill, but also to continue to create several 3D curves from a single view (FIG. 38). If a new first sketch curve intersects the image of an existing 3D curve (FIG. 38(c)), the user may intend to create a new 3D curve that meets the existing 3D curve. By indicating a 2D mark 3800 (FIG. 38(d)) that depicts a position through which the user's second sketch passes to guarantee that a new pair of 3D curves meet the existing 3D curves (FIG. 38(f)), the curve model generation software helps the user sketch curves in perspective.

FIG. 30(c) illustrates how the position of the 2D mark ($\tilde{x}$) is calculated that a second sketch curve must pass so that new 3D curves meet existing 3D curves in space. The mirrored ray surface $R_{M,new}$ is first defined from a new ray surface $R_{1,new}$ of e and a new first sketch curve $\tilde{S}_{1,new}$. The image ($\tilde{x}$) of the intersection point x of $R_{M,new}$ and existing 3D curves is then displayed.

Figure 37:
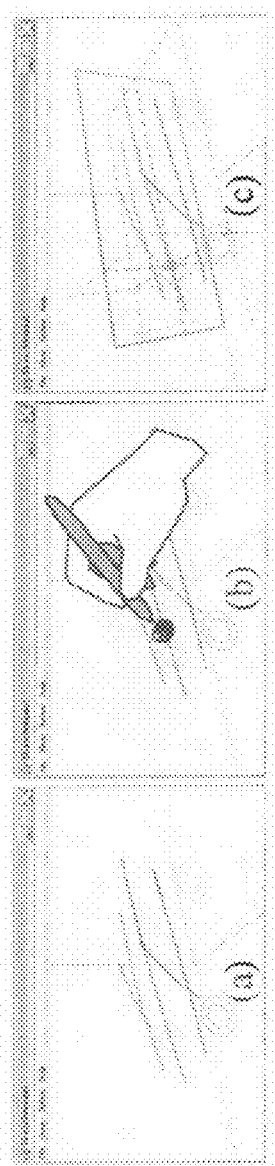
FIGS. 37(a)-(c) show the use of the dot gesture to set up three orthographic sketch planes in accordance with an aspect.

In an aspect of the present invention, creation of 3D curves on orthographic planes is provided. A prior art system of creates a 3D planar curve by projecting the user's 2D sketch onto a movable 3D orthographic plane, (Tsang, S., Balakrishnan, R., Singh, K., and Ranjan, A., 2004, "A Suggestive interface for Image Guided 3D Sketching," *Proceedings of CHI* 2004, ACM Press, 591-598.) in an aspect of the present invention, the user defines an orthographic sketch plane by using pen gestures, and sketches 3D vector curves (illustratively, 3D NURBS curves) on it as 2D sketch strokes as described above. With reference to FIGS. 37(a)-(c), the user first creates a point mark on a curve by using the dot gesture (FIG. 37(b)), or selects a curve intersection point using the circle gesture. Then three orthographic planes that intersect with one another at the point are created, and one among them, which is the most perpendicular to the current view vector, is selected as the sketch plane (FIG. 37(c)). With reference to FIGS. 38(a) and (b), the user can create 3D orthographic planar curves using the multi-stoke method described above. By changing the 3D view, the user can select other orthographic plane (among the three planes) as the sketch plane (FIGS. 33(c) and (d)). On the sketch plane, the intersection points with existing 3D curves except the curves on the current sketch plane are displayed as a drawing hint that shows the geometric relation among curves in 3D space. (FIGS. 38(d)-(f)). If the system is still in the orthographic plane sketch mode, the user can continue to choose a different set of sketch planes.

It is known to use ruled surfaces as a construction aids on which 2D curve input is projected for creating non-planar 3D curves. (Grossman, T., Balakrishnan, R., Kurtenbach, G., Fitzmaurice, G., Khan, A., and Buxton, B., 2002, "Creating Principal 3D Curves with Digital Tape Drawing," *Proceedings of CHI* 2002, ACM Press, 121-128; Tsang, S., Balakrishnan, R., Singh, K., and Ranjan, A., 2004, "A Suggestive Interface for Image Guided 3D Sketching," *Proceedings of CHI* 2004, ACM Press, 591-598) The underlying principle is the same as the shadow sketch described in Cohen, J. M., Markossan, L, Zeleznik, R. C., Hughes, J. F., and Barzel, R., 1999, "An Interface for Sketching 3D Curves," *Proceedings of I3D* 1999, ACM Press, 17-22, but it has some, benefits. The user can create many 3D curves on ruled surfaces, and change a view appropriate for different curves.

With reference to FIGS. 39(a)-(f), an aspect of the present invention provides for creation of 3D curves on orthographic ruled surfaces. In accordance with this aspect, any 3D curve selected using the circle gesture can be a generator of ruled surfaces. (FIG. 39(b)). Similar to sketching on orthographic planes, three ruled surfaces are created, which extrude the selected generator curve along x, y, and z-axis, respectively. According to the viewing direction, one ruled surface that is best shown for sketching is selected (FIG. 39(c)). The user sketches non-planar 3D curves on the surface while using the intersection point hint (FIGS. 39(d) and (e)). The user continues to work by choosing a new curve (FIG. 39(f)) and sketching on a different ruled surface from a different view (FIGS. 39(g)-(i)).

Figure 41:
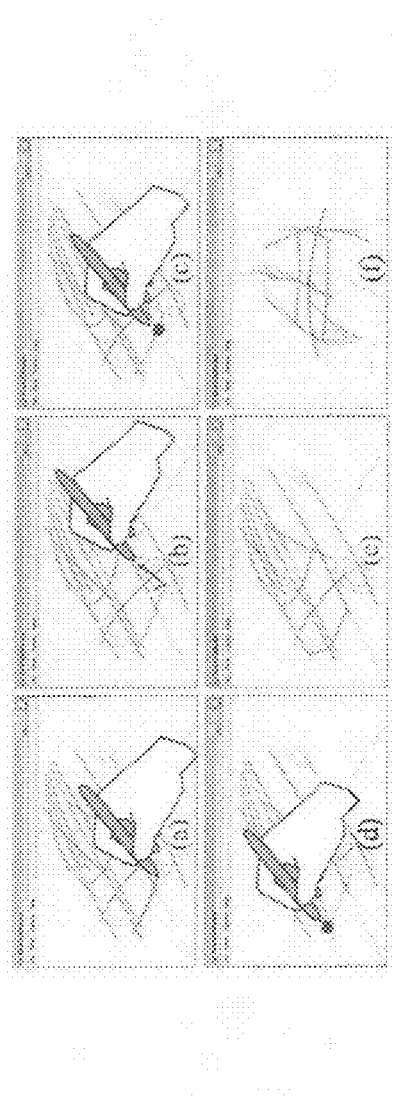
FIGS. 41(a)-(f) show creation of a pair of symmetric lines by specifying geometric constraints in accordance with an aspect.

With reference to FIGS. 40(a)-(f), new 3D curves are easily created by specifying a geometric relation with existing 3D curves. In this aspect, if is particularly useful to create a 3D curve crossing the center plane. After sketching a 2D curve with the multi-stroke method (FIGS. 40(a)-(c)), the user applies the a first dot gesture on a 3D vector curve located on a center plane (FIG. 40(d)), and then applies a second dot gesture on a second 3D vector curve (FIG. 40(e)). Then the curve model generation software then creates a smooth symmetric 3D vector curve that goes through the two points (the first and second dot gestures) that the user specified (FIG. 40(f)). If the first position constraint (first dot gesture) is not on the center plane, the computer creates a pair of symmetric lines that are 3D vector curves. In the latter case, the second dot gesture can be applied to any other pre-existing curve, whether on the center plane or not. Thus, the user can create an angular form as shown in FIGS. 41(*a*)-(*f*).

Figure 42:
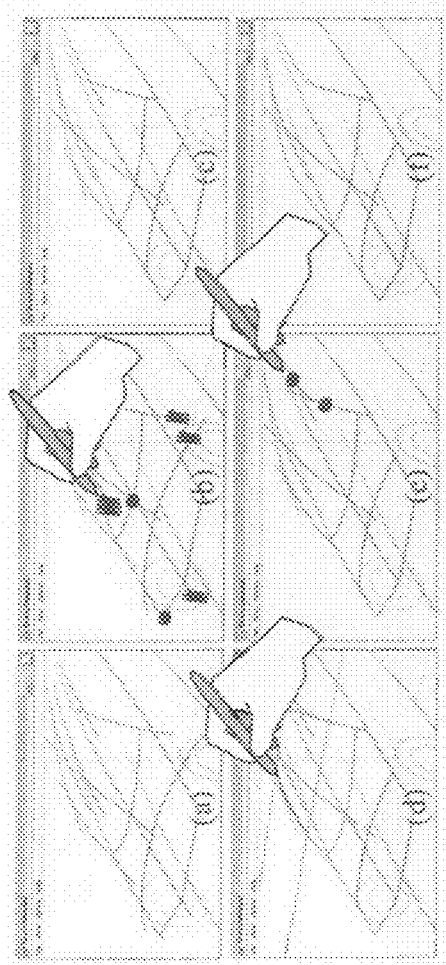
FIGS. 42(a)-(f) show 3D curve editing with pen-gestures in accordance with an aspect.

In an aspect, the curve editing techniques described above are used for 3D curve editing, 3D curve intersection tightening and end-point snapping by using the dot gesture. 3D curve trimming and deleting using the scratch-out gesture are shown in FIGS. 42(*a*)-(*c*), and 3D curve filleting combined with the mirror-symmetric 3D curve sketch in FIGS. 42(*d*)-(*f*).

For 3D curve editing, 3D distance and 3D angle should be employed. The fog effect (described above) is used that helps the user estimate the 3D gap between the 3D curves that are displayed overlapped. The navigation interface described above also plays an important role in 3D curve editing. When the users curve editing gesture is applied, among the curves displayed under the gesture strokes, only those closest to the viewpoint within the specified 3D distance tolerance are considered for the corresponding editing operation. In 3D, the application of the dot gesture (for curve tightening) on even only two curves is meaningful because they may be apart even if they appear intersected with each other from a certain viewpoint.

In general, it is not easy to create a complicated 3D curve by using 3D curve sketch methods. To match two 2D curves sketched from different viewpoints is difficult or sometimes impossible, (Cohen, J. M., Markosian, L, Zeleznik, R. C., Hughes, J. F., and Barzel, R., 1999, "An interface for Sketching 3D Curves," *Proceedings of I3D* 1999, ACM Press, 17-22; Karpenko, Q., Hughes, J. F., and Raskar, R., 2004, "Epipolar Methods for Multi-View Sketching," *Proceedings of the* 2004 *EUROGRAPHICS Workshop on Sketch-Based Interfaces and Modeling,* 187-173) However in accordance with above described aspects of the present invention, curve matching is relatively easy because the user sketches only simple 3D curves to be used for building a complex 3D form later.

Figure 27:
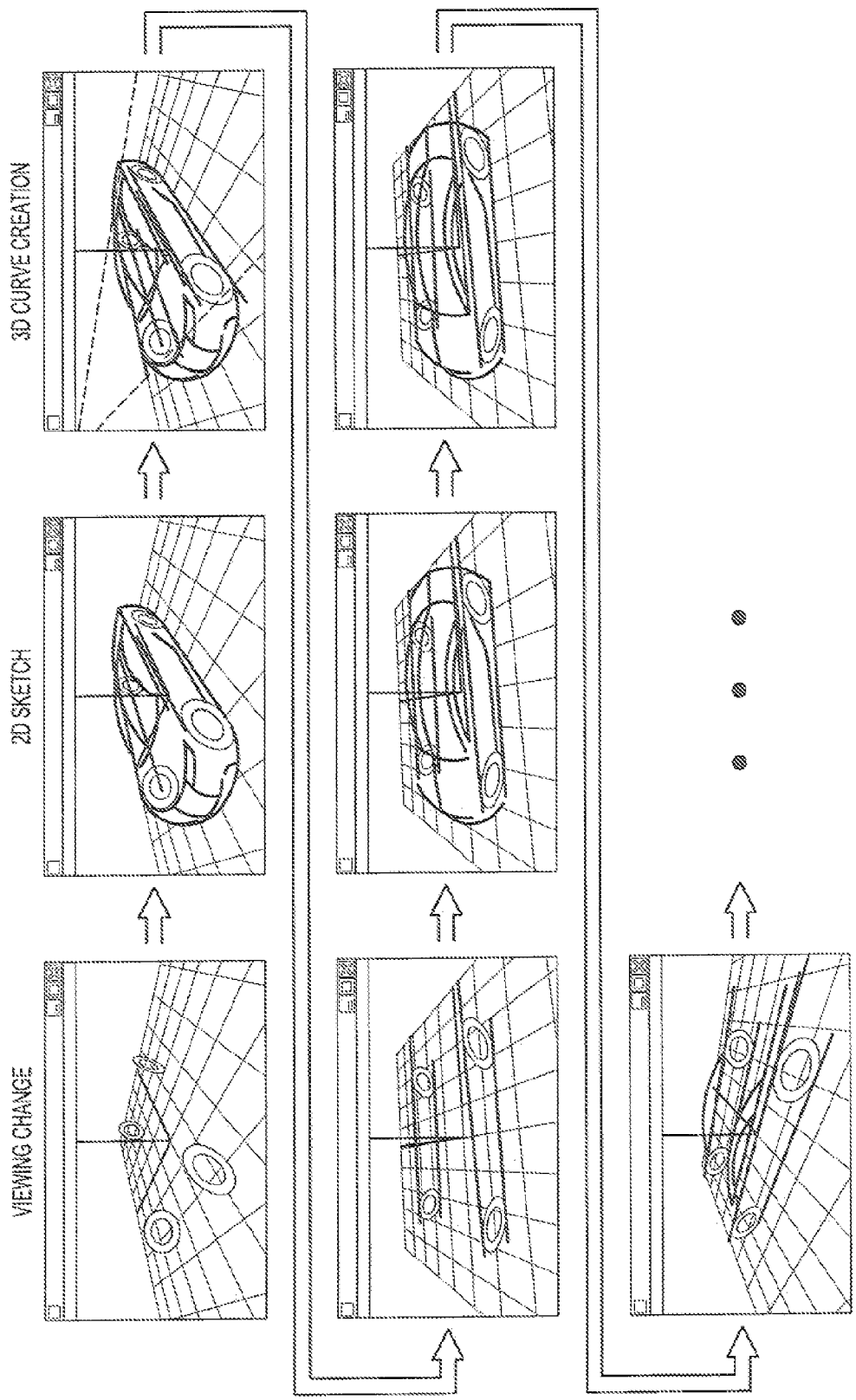
FIG. 27 is a diagram showing an exemplary embodiment of a 3D modeling workflow in accordance with an aspect.

FIG. 27 illustrates a 3D modeling workflow in accordance with an aspect of the invention. This may illustratively be a repetitive process integrated with 2D thumbnail sketch, such as the multi-stroke vector curve creation discussed above, and allows users to leverage their perspective sketch ability in 3D modeling.

In the ideation stage of the early design process, such as the design of automotive vehicles, the designer creates a lot of thumbnail sketches to conceive new design ideas and study their 3D forms (e.g., how a sketch from a view can be seen from different views, how many sketches from multiple views can be combined, etc.) In an aspect of the 3D modeling workflow, the user creates temporary thumbnail sketches in the middle of a 3D curve sketch while using existing 3D curves as a 2D sketch underlay, and in turn creates 3D curves by using the thumbnail sketches as references. This allows the user to not only eliminate unnecessary thumbnail sketches to explore design ideas in 3D, but also obtain inspiration from the intermediate 3D curves and 2D sketches. Further, the 3D digital models can be used for other design activities such as engineering studies, bench marking, and component packaging from very early stages of the design process. This digitally organized design process allows simplification of the design iteration process and reduction of the design life cycle (the length of time required for the design process).

Figure 28:
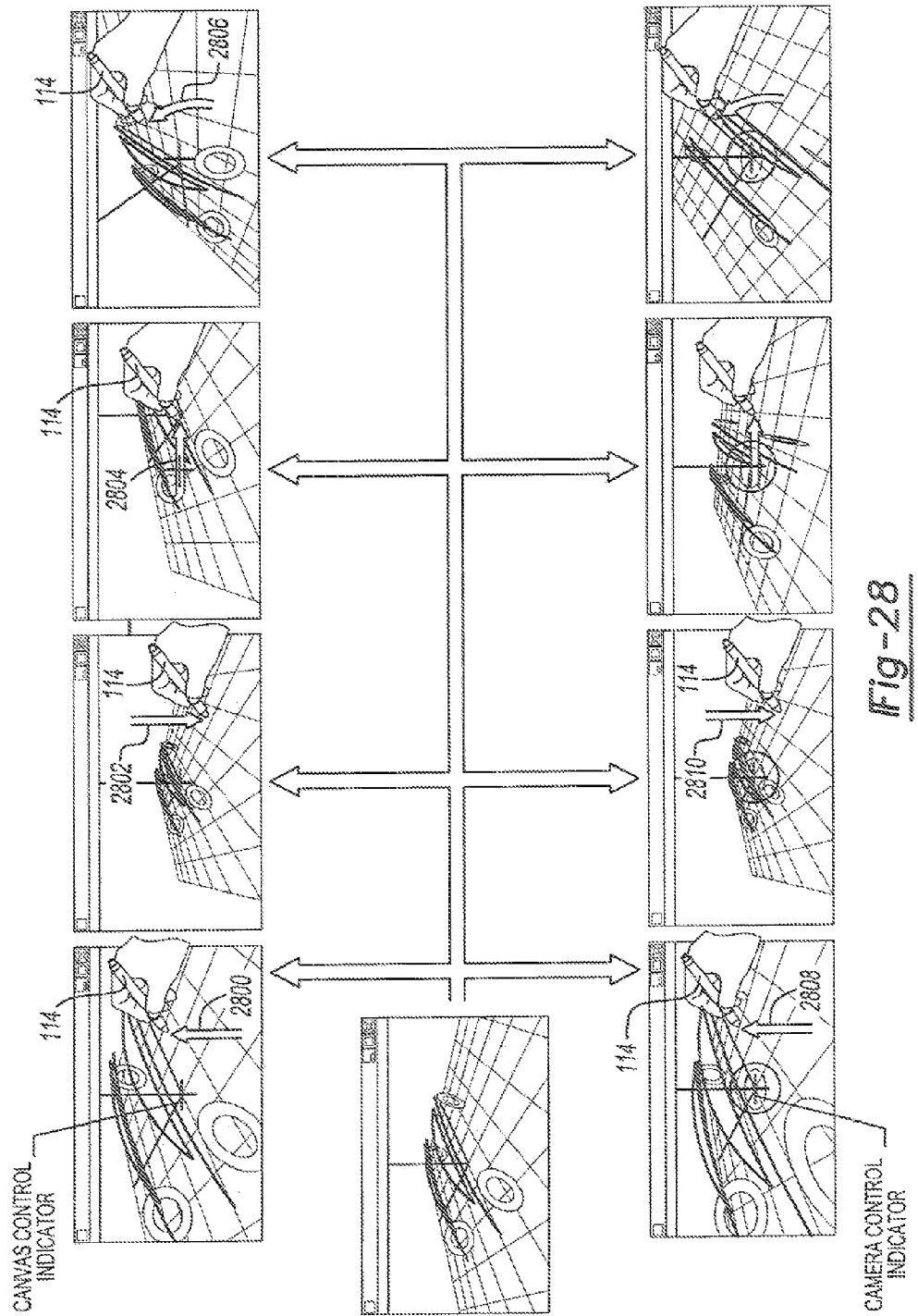
FIG. 28 show an exemplary embodiment of a pen-based drawing system having a unified gesture-based interface for both canvas and camera control in accordance with an aspect.

The 3D aspect may illustratively use a unified pen gesture-based interface for both canvas and camera control, similar to that described above. With reference to FIG. 28, a user selects canvas or camera control quasi-mode, Illustratively by holding down a button on the pen 114 or a key on the computer keyboard 110. While holding the button or key down, the user then makes the appropriate motion gesture with pen 114. If, for example, the user selects canvas control, as shown in FIG. 28, a linear vertical up pen motion gesture 2800 starts canvas zoom in and a linear vertical down pen motion gesture 2802 starts canvas zoom out. A linear horizontal pen motion gesture 2804 starts canvas pan, and a circular pen motion gesture 2808 starts canvas rotate. After a start motion gesture, the user can use pen 114 to move the canvas in the manner selected by the start gesture. The same occurs when the user selects camera control quasi-mode, such as by holding down the appropriate key on keyboard 110 or button on pen 114, again as shown in FIG. 28. (Linear vertical up pen motion gesture 2808 to start camera dolly in, linear vertical down pen motion gesture 2810 to start camera doily out, linear horizontal pen motion gesture 2812 to start camera pan, and circular pen motion gesture 2814 to start camera orbit.)

The gesture based canvas/camera control in accordance with the above provides an intuitive and consistent gesture convention so that users need not remember complex hot-key/button combinations. This enhances the drawing and design ability as it reduces (if not eliminates) the interference with the drawing process caused by drawing program user interfaces that use hot-key/button combinations. The mode change among drawing, canvas control, and camera control is done by holding down appropriate buttons on the drawing pen stylus 114 and/or keys on the computer keyboard 110 when changing from drawing mode to either canvas control quasi-mode or camera control quasi-mode. Releasing the button or key results in return to the drawing mode, Quasi-mode indicators are illustratively shown on the screen 106 to give visual feedback of the current quasi-mode. For example, as illustratively shown in FIG. 28, a indicator on the screen indicates that the curve model generation software is in canvas control quasi-mode, a "+ in a sphere" Indicator on the screen indicates that the curve model generation software is: In camera control quasi-mode, and no indicator on the screen indicates that the curve modeling program is in drawing mode.

The 3D aspect illustratively also uses gesture based curve editing similar to that described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drawing system, comprising:
   a computer system having a display and a pen input device having a pen stylus;
   the computer system having curve model generation software running thereon; and
   the curve model generation software responsive to a gesture made with the pen stylus selecting a point on a 3D vector curve and generating three orthographic planes that intersect with one another at the point selected on the vector curve and selecting the orthographic plane that is most perpendicular to a current view vector as a sketch plane.

2. The system of claim 1 wherein the curve model generation software is responsive to a change in a 3D view to change which of the three orthographic planes is selected as the sketch plane.

3. The system of claim 1 wherein one or more intersection points of existing 3D curves with the sketch plane are displayed by the curve model generation software as a drawing hint that shows a geometric relation among two or more of the existing 3D curves in 3D space.

4. The system of claim 1 wherein the gesture made with the pen stylus selecting the point on an existing 3D vector curve includes a dot gesture applied to the existing 3D vector curve or a circle gesture applied around an intersection of the existing 3D vector curve with at least one other existing 3D vector curve.

5. The system of claim 1 wherein the curve model generation software is responsive when in a drawing mode to a plurality of different edit gestures made with the pen stylus and editing based on each different edit gesture a different aspect of any vector curve or vector curves to which the edit gesture is applied.

6. The system of claim 5 wherein the curve model generation software is responsive in a quasi-mode to canvas and camera control pen gestures for controlling canvas and camera navigation.

7. The system of claim 6 wherein the drawing mode includes a 2D drawing mode and a 3D drawing mode.

8. The system of claim 7 wherein the pen gestures for controlling canvas and camera navigation when the curve model generation software has switched to the navigation quasi-mode from the 2D drawing mode are the same as the pen gestures for controlling canvas and camera navigation when the curve model generation software has switched to the navigation quasi-mode from the 3D drawing mode.

9. The system of claim 1 wherein in response to a check gesture the curve model generation software displays on the canvas where the check gesture was applied a check menu having selections for drawing modes.

10. The system of claim 9 wherein the check menu includes selections for commands used to select 2D, 3D mirror symmetric curve, 3D orthographic plane, 3D orthographic ruled surface, and geometric-constraint based 3D cross curve drawing modes.

11. They system of claim 10 wherein the selections on the check menu are arranged in an arc so that a user can reach each selection with little hand movement.

12. The system of claim 1 wherein the curve model generation software applies a fog effect to a 3D curve of a model to provide depth information.

13. The system of claim 1 wherein, in response to sketching on the sketch plane, the curve model generation software generates a pair of symmetric 3D curves.

14. A drawing system, comprising:
a computer system having a display and a pen input device having a pen stylus;
the computer system having curve model generation software running thereon; and
the curve model generation software responsive to a circle gesture made with the pen stylus selecting a 3D vector curve and generating three orthographic ruled surfaces created by extruding the selected 3D vector curve along x, y, and z axes and based on viewing direction, selecting one of the three orthographic ruled surfaces as a sketch surface.

15. The system of claim 14 wherein the curve model generation software is responsive to a change in a 3D view to change which of the three orthographic ruled surfaces is selected as the sketch surface.

16. The system of claim 14 wherein one or more intersection points of existing 3D curves with the sketch surface are displayed by the curve model generation software as a drawing hint that shows a geometric relation among two or more of the existing 3D curves in 3D space.

17. The system of claim 14 wherein the curve model generation software is responsive when in a drawing mode to a plurality of different edit gestures made with the pen stylus and editing based on each different edit gesture a different aspect of any vector curve or vector curves to which the edit gesture is applied.

18. The system of claim 17 wherein the curve model generation software is responsive in a quasi-mode to canvas and camera control pen gestures for controlling canvas and camera navigation.

19. The system of claim 18 wherein the drawing mode includes a 2D drawing mode and a 3D drawing mode.

20. The system of claim 19 wherein the pen gestures for controlling canvas and camera navigation when the curve model generation software has switched to the navigation quasi-mode from the 2D drawing mode are the same as the pen gestures for controlling canvas and camera navigation when the curve model generation software has switched to the navigation quasi-mode from the 3D drawing mode.

21. The system of claim 14 wherein in response to a check gesture the curve model generation software displays on the canvas where the check gesture was applied a check menu having selections for drawing modes.

22. The system of claim 21 wherein the check menu includes selections for commands used to select 2D, 3D mirror symmetric curve, 3D orthographic plane, 3D orthographic ruled surface, and geometric-constraint based 3D cross curve drawing modes.

23. They system of claim 22 wherein the selections on the check menu are arranged in an arc so that a user can reach each selection with little hand movement.

24. The system of claim 14 wherein the curve model generation software applies a fog effect to a 3D curve of a model to provide depth information.

25. The system of claim 14 wherein, in response to sketching on the sketch plane, the curve model generation software generates a pair of symmetric 3D curves.

* * * * *